US008200563B2

(12) United States Patent
Moran et al.

(10) Patent No.: US 8,200,563 B2
(45) Date of Patent: Jun. 12, 2012

(54) PUBLISH AND SUBSCRIBE SYSTEM INCLUDING BUFFER

(75) Inventors: James P Moran, Hinsdale, IL (US);
Jacob Doornebos, Riverside, IL (US);
Michael King, Naperville, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 285 days.

(21) Appl. No.: 12/536,994

(22) Filed: Aug. 6, 2009

(65) Prior Publication Data
US 2009/0299914 A1 Dec. 3, 2009

Related U.S. Application Data

(63) Continuation-in-part of application No. 12/335,246, filed on Dec. 15, 2008, now Pat. No. 8,095,452, which is a continuation-in-part of application No. 11/696,555, filed on Apr. 4, 2007, now abandoned, which is a continuation-in-part of application No. 11/276,752, filed on Mar. 13, 2006, now abandoned, which is a continuation-in-part of application No. 11/234,697, filed on Sep. 23, 2005.

(51) Int. Cl.
*G06Q 40/00* (2012.01)
*G06F 15/16* (2006.01)
(52) U.S. Cl. ........ 705/36 R; 705/37; 709/204; 709/205; 709/206; 709/207; 709/218; 709/236; 709/238
(58) Field of Classification Search ........................ None
See application file for complete search history.

(56) References Cited

U.S. PATENT DOCUMENTS

| 5,590,362 | A | 12/1996 | Baum et al. |
| 5,719,564 | A | 2/1998 | Sears |
| 5,729,742 | A | 3/1998 | Harbinski et al. |
| 5,845,276 | A | 12/1998 | Emerson et al. |
| 6,205,223 | B1* | 3/2001 | Rao et al. .................. 380/42 |
| 6,212,568 | B1* | 4/2001 | Miller et al. .................. 709/236 |

(Continued)

FOREIGN PATENT DOCUMENTS
WO 2006042066 A1 4/2006
(Continued)

OTHER PUBLICATIONS

Complementary Methods for QoS Adaptation in Component-based Multi-Agent Systems; John Zinky, Richard Shapiro, Sarah Siracuse; BBN Technologies; Multi-Agent Security and Survivability, 2004 IEEE First Symposium; Aug. 30-31, 2004; 10-pages.*

(Continued)

*Primary Examiner* — Gregory Johnson
(74) *Attorney, Agent, or Firm* — Banner & Witcoff, Ltd.

(57) ABSTRACT

Systems and methods for delivering a plurality of trading data messages to a server in connection with the monitoring the trading of financial instruments are provided. A listener subscribes to a subset of the plurality of trading data messages generated by market participants or components within the trading platform. A buffer receives the subset of the plurality of trading data messages and stores the subset of the plurality of trading data messages. A server, such as a live alerts server, receives the subset of the plurality of trading data messages stored from the buffer and analyzes the subset of the plurality of trading data.

15 Claims, 20 Drawing Sheets

U.S. PATENT DOCUMENTS

| | | | |
|---|---|---|---|
| 6,243,719 B1* | 6/2001 | Ikuta et al. | 1/1 |
| 6,389,510 B1 | 5/2002 | Chen et al. | |
| 6,865,650 B1 | 3/2005 | Morley et al. | |
| 6,879,987 B2 | 4/2005 | Hsieh | |
| 6,907,422 B1 | 6/2005 | Predovic et al. | |
| 6,993,511 B2 | 1/2006 | Himmelstein | |
| 7,079,023 B2 | 7/2006 | Haller | |
| 7,716,525 B1* | 5/2010 | Buchko et al. | 714/22 |
| 2002/0004774 A1 | 1/2002 | Defarlo | |
| 2002/0023077 A1 | 2/2002 | Nguyen et al. | |
| 2002/0040352 A1* | 4/2002 | McCormick | 705/80 |
| 2002/0055886 A1 | 5/2002 | Hinckley | |
| 2002/0077962 A1* | 6/2002 | Donato et al. | 705/37 |
| 2002/0120919 A1* | 8/2002 | Aizenbud-Reshef et al. | 717/127 |
| 2003/0028506 A1 | 2/2003 | Yu et al. | |
| 2003/0040955 A1 | 2/2003 | Anaya et al. | |
| 2003/0041000 A1* | 2/2003 | Zajac et al. | 705/37 |
| 2003/0055776 A1 | 3/2003 | Samuelson | |
| 2003/0065709 A1 | 4/2003 | Jordan et al. | |
| 2003/0084028 A1 | 5/2003 | Hsieh | |
| 2003/0115120 A1 | 6/2003 | Kramer et al. | |
| 2003/0120593 A1* | 6/2003 | Bansal et al. | 705/39 |
| 2003/0120785 A1* | 6/2003 | Young | 709/228 |
| 2003/0135556 A1* | 7/2003 | Holdsworth | 709/206 |
| 2003/0145042 A1* | 7/2003 | Berry et al. | 709/203 |
| 2004/0001498 A1* | 1/2004 | Chen et al. | 370/401 |
| 2004/0044609 A1* | 3/2004 | Moore | 705/37 |
| 2004/0098663 A1 | 5/2004 | Rey et al. | |
| 2004/0107123 A1 | 6/2004 | Haffner et al. | |
| 2004/0205439 A1* | 10/2004 | Carmeli et al. | 714/748 |
| 2004/0254993 A1* | 12/2004 | Mamas | 709/206 |
| 2005/0021843 A1* | 1/2005 | Duigenan et al. | 709/238 |
| 2005/0086295 A1 | 4/2005 | Cunningham et al. | |
| 2005/0128943 A1* | 6/2005 | Gibbs et al. | 370/229 |
| 2005/0256931 A1* | 11/2005 | Follmeg et al. | 709/206 |
| 2005/0273499 A1* | 12/2005 | Goodman et al. | 709/206 |
| 2005/0283353 A1* | 12/2005 | Billingsley et al. | 703/23 |
| 2006/0013367 A1 | 1/2006 | Sawyer et al. | |
| 2006/0036448 A1* | 2/2006 | Haynie et al. | 705/1 |
| 2006/0047666 A1* | 3/2006 | Bedi et al. | 707/10 |
| 2006/0053425 A1* | 3/2006 | Berkman et al. | 719/313 |
| 2006/0085507 A1* | 4/2006 | Zhao et al. | 709/206 |
| 2006/0146999 A1* | 7/2006 | Thompson et al. | 379/88.18 |
| 2006/0224668 A1* | 10/2006 | Ginis | 709/204 |
| 2006/0224683 A1* | 10/2006 | Briscoe et al. | 709/207 |
| 2006/0242371 A1 | 10/2006 | Shono et al. | |
| 2006/0248143 A1* | 11/2006 | Collison et al. | 709/204 |
| 2007/0014302 A1* | 1/2007 | Vincent | 370/401 |
| 2007/0025351 A1* | 2/2007 | Cohen | 370/390 |
| 2007/0073634 A1 | 3/2007 | Meacham et al. | |
| 2007/0073804 A1* | 3/2007 | Allman et al. | 709/203 |
| 2007/0192230 A1 | 8/2007 | Meacham et al. | |
| 2007/0192706 A1* | 8/2007 | Bruce et al. | 715/742 |
| 2007/0198397 A1* | 8/2007 | McGinley et al. | 705/37 |
| 2007/0198629 A1* | 8/2007 | Ganguly et al. | 709/203 |
| 2007/0276956 A1* | 11/2007 | Dorai et al. | 709/238 |
| 2008/0005294 A1 | 1/2008 | Morris | |
| 2008/0103854 A1* | 5/2008 | Adam et al. | 705/7 |
| 2009/0138572 A1* | 5/2009 | Banks et al. | 709/218 |
| 2009/0299914 A1 | 12/2009 | Moran et al. | |
| 2010/0023587 A1* | 1/2010 | Fletcher et al. | 709/206 |

FOREIGN PATENT DOCUMENTS

WO 2008073009 A1 6/2008

OTHER PUBLICATIONS

Towards a publish/subscribe control architecture for precision assembly with the Data Distribution Service; Marco Ryll and Svetan Ratchev; Micro-Assembly Technologies and Applications IFIP International Federation for Information Processing, 2008, vol. 260/2008, 359-369; 11-pages.*

The Many Faces of Publish/Subscribe; Patrick TH. Eugster, Pascal A. Felber, Rachid Guerraoui and Anne-Marie Kermarrec; ACM Computing Surveys, vol. 35, No. 2, Jun. 2003; 18-pages.*

An Efficient Multicast Protocol for Content-Based Publish-Subscribe Systems; Guruduth Banavar, Tushar Chandra, Bodhi Mukherjee, Jay Nagarajarao, Robert E. Strom, and Daniel C. Sturman; Distributed Computing Systems, 1999; 11-pages.*

Towards Expressive Publish/Subscribe Systems; Alan Demers, Johannes Gehrke, Mingsheng Hong, Mirek Riedewald, and Walker White; Advances in Database Technology—EDBT 2006, Lecture Notes in Computer Science, 2006, vol. 3896/2006; 18-pages.*

Subscription Summarization: A New Paradigm for Efficient Publish/Subscribe Systems; Distributed Computing Systems, 2004; 11-pages.*

Licht, B., "Database Time Test Scores", Borland Delphi for windows, City Zoo, 1995.

Wayback machine, "http://web.archive.org/web/*/http://www.mindspring.com/~cityzoo/dbperf.html".

Wayback machine, "http://web.archive.org/web/19981206071324/http://www.mindspring.com/~cityzoo/dbperf.html".

International Preliminary Report on Patentability from International Application No. PCT/US2007/067224, date mailed Oct. 15, 2009, 6 pages.

Eugster, et al., "The Many Faces of Publish/Subscribe", in ACM Computing Surveys, vol. 35, No. 2, pp. 114-131, Published Jun. 2003 (online) Retrieved from the internet <URL: http://www.ece.rutgers.edu/~parashar/Classes/03-04/ece572/papers/facesps.pdf.

International Search Report from International Application No. PCT/US10/44351 mailed Oct. 15, 2010, 3 pages.

* cited by examiner

11/21/2006 00:00:00 - 11/21/2006 23:59:59

(Account = "AAAAA" AND Firm = "FFFFF") AND (Instrument = "ESZ6")

Executions

| Buy | Sell | Net Pos | P&L | Last Price |
|-----|------|---------|---------|-----------|
| 296 | 298 | -2 | 1450.00 | 140650.00 |

— 1302

| Bid | | | | | Offer | | | | |
|-------|-------|--------|-------|---------|-------|-------|--------|-------|---------|
| Price | Quant | UserID | SLE | Account | Price | Quant | UserID | SLE | Account |
| 140600 | 2 | UUUUU | SSSSS | AAAAA | 140675 | 39 | UUUUU | SSSSS | AAAAA |
| 140575 | 7 | UUUUU | SSSSS | AAAAA | 140725 | 32 | UUUUU | SSSSS | AAAAA |

PUBLISH AND SUBSCRIBE SYSTEM INCLUDING BUFFER

The present application is a continuation-in-part of application U.S. Ser. No. 12/335,246, filed Dec. 15, 2008 and entitled "Live Alerts," which is a continuation-in-part application of U.S. Ser. No. 11/696,555, filed Apr. 4, 2007 and entitled "Live Profile," which is a continuation-in-part application of U.S. Ser. No. 11/276,752, filed Mar. 13, 2006 and entitled "Match System That Uses A Non-Indexed Collection of Orders," which is a continuation-in-part application of U.S. Ser. No. 11/234,697, filed Sep. 23, 2005 and entitled "Non-Indexed In-Memory Data Storage and Retrieval." The entire disclosures of all of these applications are hereby incorporated in their entirety by reference herein.

FIELD OF THE INVENTION

The present invention relates to systems, methods and user interfaces that are utilized in connection with the trading of financial instruments. More particularly, a system for delivering messages to a server through a buffer on a publish/subscribe system. The server may be a live alert system that generates messages, including links that may be used to generate real-time reports when a rule or limit is violated.

DESCRIPTION OF THE RELATED ART

Modern financial institutions process and monitor a large volume of trading data, such as orders for financial instruments. Financial instruments include options contracts, futures contracts, options on futures contracts, interest rate products, securities, commodities, equity contracts, etc. Institutions that administer transactions in financial instruments process and store large amounts of trading data every second of the trading day. Moreover, upon executing a trade, processors continually access and distribute market data, which is a subset of trading data.

Financial institutions, such as exchanges, may provide regulatory or market oversight to monitor trade activity. Regulatory or other oversight entities often analyze trading data for compliance with regulations and to ensure market and financial integrity. The analysis of ever increasing amounts of trading data can be a significant burden on regulatory or other oversight entities.

Therefore, there exists a need in the art for automated systems and methods that help regulators and others analyze trading data.

SUMMARY OF THE INVENTION

Aspects of the invention overcome at least some of the above problems and limitations by providing systems and methods for delivering a plurality of trading data messages from a match engine to a server. One or more listeners each subscribe to a subset or subsets of the plurality of trading data messages according to a criterion. The criteria may include message source, message content, or intended destination. A buffer receives the subset or subsets of the plurality of trading data messages and stores messages temporarily for some time period. The timer period may be a set duration or be based on the rate of messages received. A server receives the trading data messages stored from the buffer and analyzes the trading data messages.

The server may be a live alert server alerting the regulators and other trading entities when one or more rules or limits are violated. The live alert server receives trade messages and includes computer-executable instructions for comparing trading data to one or more rules. The live alert server generates a rule message when a rule or limit is violated. An email server is configured to receive the rule message and generate an email message that includes a link for generating a report relating to the violated rule or limit.

Of course, the apparatuses, methods and systems disclosed herein may also include other additional elements, steps, computer-executable instructions, or computer-readable data structures. The details of these and other embodiments are set forth in the accompanying drawings and the description below. Other features and advantages will be apparent from the description and drawings, and from the claims.

BRIEF DESCRIPTION OF THE DRAWINGS

Aspects of the invention may take physical form in certain parts and steps, embodiments of which will be described in detail in the following description and illustrated in the accompanying drawings that form a part hereof, wherein:

FIG. 13 illustrates a graphical user interface that shows executed order data and pending order data;

DETAILED DESCRIPTION

Exemplary Operating Environment

Figure 1:
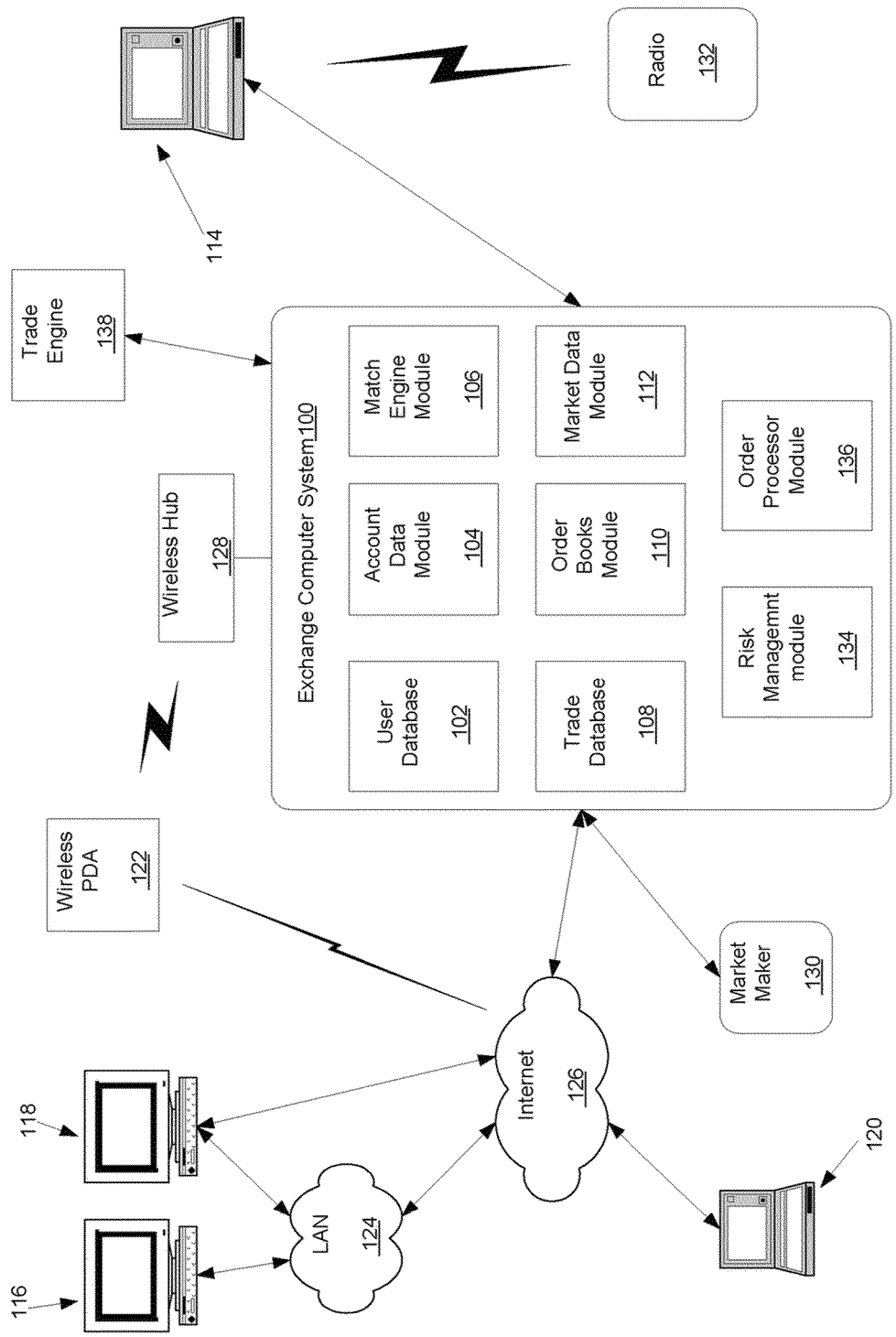
FIG. 1 shows a computer network system.

Aspects of the embodiments are preferably implemented with computer devices, methods, systems and computer networks for exchange trading information. An exemplary trading network environment for implementing trading systems and methods is shown in FIG. 1.

An exchange computer system 100 receives orders and transmits market data related to orders and trades to users. Exchange computer system 100 may be implemented with one or more mainframe, servers, gateways, desktop, handheld and/or other computers. In one embodiment, a computer device uses a 64-bit (or more) processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card, such as an Ethernet card, or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

Figure 2:
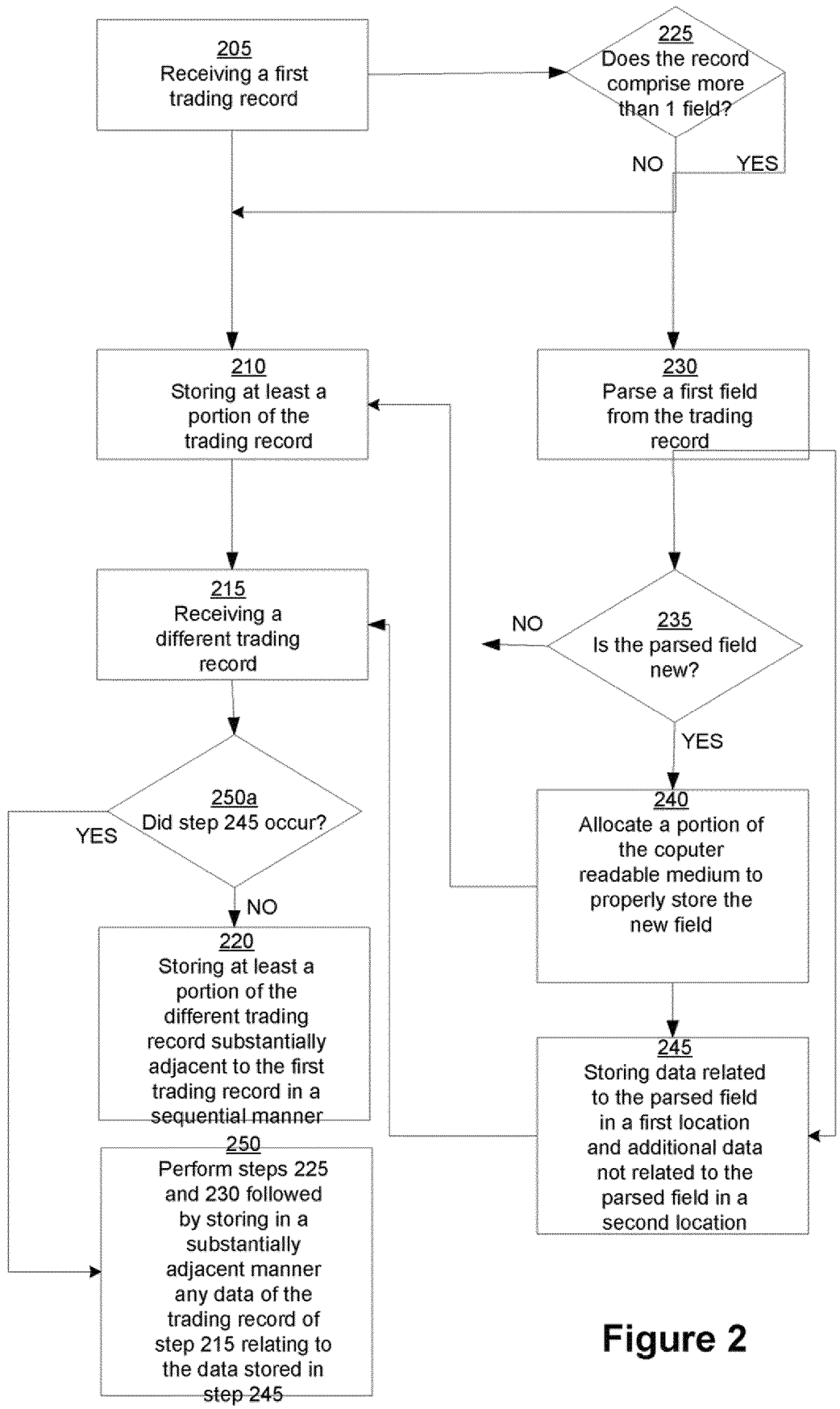
FIG. 2 shows a flowchart of one illustrative method of storing trading data in a computing environment.

FIG. 2 shows a flowchart of one illustrative method of storing trading data in a computing environment. A first trading record having trading data is received in step 205. The trading record may be an order received at an exchange, a market data distributed by an exchange or a trade. Alternatively or in addition, the trading record may be a record created by an exchange that represents an order book for one or more financial instruments, the state of an order book, orders received and processed for one or more financial instruments, or any other information that may be used, processed, delivered to, and/or received by an exchange or entity involved with trading, administering, monitoring and/or facilitating financial transactions. The trading data may include one or more specific identifiers of an order or trade, including: the time and date of the order or trade, the individual or firm that submitted an order, price information and/or the identification and quantity of financial instruments. The trading record may include an order first transmitted from computer device 116 and/or PDA 122 through LAN 124 and/or Internet 126 and may be further processed by order processing module 136. The trading record received in step 205 additionally or alternatively may include market data distributed by one or more of the modules within Exchange Computer System 100. Other fewer, and/or additional fields may be included within, associated with or represented by a trading record.

In step 210, at least a portion of the data from the trading record received in step 205 is stored on a computer readable medium. As used herein, a computer-readable medium may include, for example, random access memory (RAM), dynamic random access memory (DRAM), flash memory, a hard disk drive, thumb drive, and/or an optical disk (CD ROM, DVD or other optical media). Solid-state memory modules allow for rapid queries due to the lack of moving parts, such as those associated with hard disk drives. The computer-readable medium may be integral with the Exchange Computer System 100 and/or may be associated with one or more modules, such as the match engine module 136.

Figure 3B:
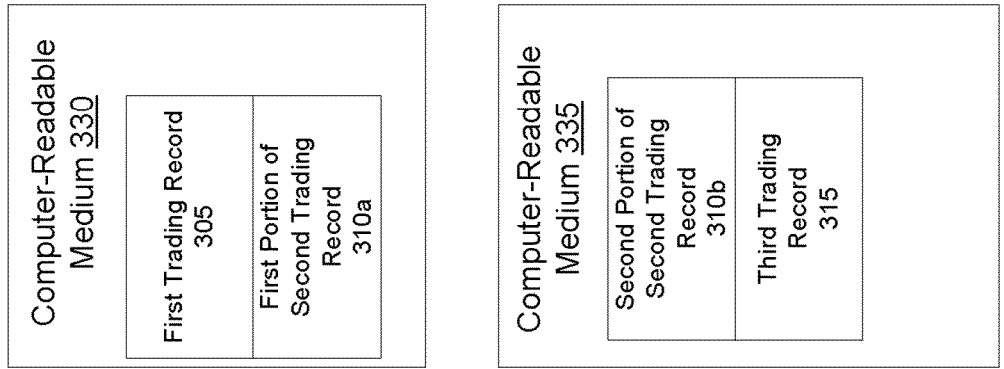
FIGS. 3a and 3b illustrates illustrative collections of trading data.
Figure 3A:
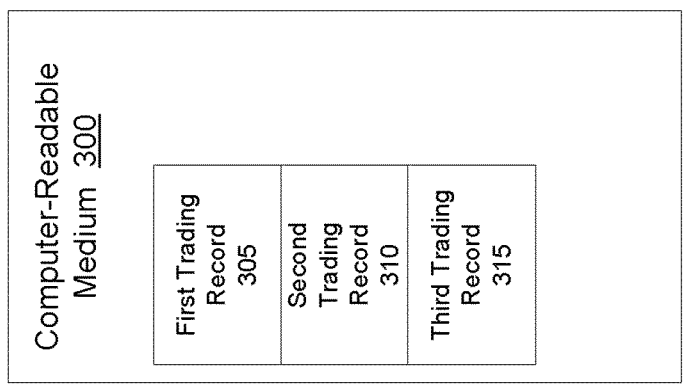

FIG. 3*a* illustrates a collection of trading data. As seen in the figure, a memory module 300, such as a RAM or optical disk, may store a plurality of trading records. For example, the trading record stored in step 205 may be visually represented as trading record 305. In step 215, a second trading record may be received. The second trading record may be of a fixed length and have substantially the same information as the first trading record received in step 205. Yet in additional or alternative embodiments, the second trading record may be of a different length than the first trading record, may have additional fields not present in the first record and/or may include additional data not present in the first record. In one embodiment, optional step 225 (explained in more detail below) may be implemented to determine if the trading record comprises more than one field.

In step 220, the second trading record (or a portion thereof) is sequentially stored in relation to the first trading record 305, wherein the data from the second trading record is stored substantially physically adjacent to the data received from the first trading record 305. One of the advantages of locating records close to one another is faster reading times. Existing database systems may have data scattered throughout a memory device. Reading data arranged in this manner is time consuming because the reading process has to skip from one physical location to another physical location. For example, a hard disk drive must physically move a reading head from location to location. FIG. 3*a* shows one illustrative embodiment where data from the second trading record 310 is stored in a sequential fashion in relation to the data stored from the first trading record 305. Unlike conventional databases, the trading data stored and as represented by 305 and 310 are not associated with an index for locating the data. As additional data and/or trading records are received, they may be stored in a substantially sequential ordering. As used herein "substantial sequential ordering" means that data is physically positioned on a computer-readable medium in a direction that a read operation will follow and does not imply that a sort operation is performed on the records or data before storing. For example, data 315 is stored substantially sequential to data 310, which is stored substantially sequential to data 305. When memory module 300 is implemented with a hard disk drive, for example, a reading head may follow a straight path to read records 305, 310 and 315.

While an exemplary embodiment may not have an index as used in conventional databases, the collection of data as represented by first trading records 305, 310 and 315 can perform row selection at the same speed as an indexed database. Indeed, in some embodiments, eliminating conventional databases indexes results in queries that have the same speed for all columns in the table. Conventional databases typically have an index on every column. This results in deleterious effects on the insertion speed. Conversely, a collection of data organized according to the various embodiments allows for rapid insertion speeds and is particularly useful and advantageous in real-time insertion situations, such as those routinely encountered in the trading industry. Moreover, by providing a collection of data without an associated database-type index, more space is available on the computer readable medium to store data, such as that present in the data of the first trading record and second trading record (305, 310). An increase in data storage may be achieved by eliminating the use of a conventional database-type index. In at least one implementation, the elimination of an index may double the amount of data that may be stored on the computer readable memory.

As one skilled in the art will appreciate, a computer-readable medium may have multiple linked drives and/or modules, where the data is stored in a sequential fashion as described above. The drives and/or modules may be at different physical or remote locations. For example, FIG. 3*b* shows two distinct physical computer-readable media (330, 335) that are configured to store data in a sequential ordering process. First trading record 305 is stored in the first portion of computer-readable medium 330, sequentially followed by a first portion of second trading record 310*a*. Since the trading record consisting of section 310*a* and 310*b* is too large to be entirely stored on computer-readable medium 330, the second portion of the second trading record 310*b* is stored on the first portion of computer-readable medium 335. Trading record 315 is also stored on computer-readable medium 335 and substantially follows the second portion of the second trading record 310*b*. In this regard, the trading records 305, 310, and 315 are sequentially stored on one or more computer-readable media arranged in a sequential order. The computer-readable media, such as computer-readable media 330 and 335, may or may not be physically ordered in a sequential manner, but rather may be configured to be sequentially store data.

Figure 4A:
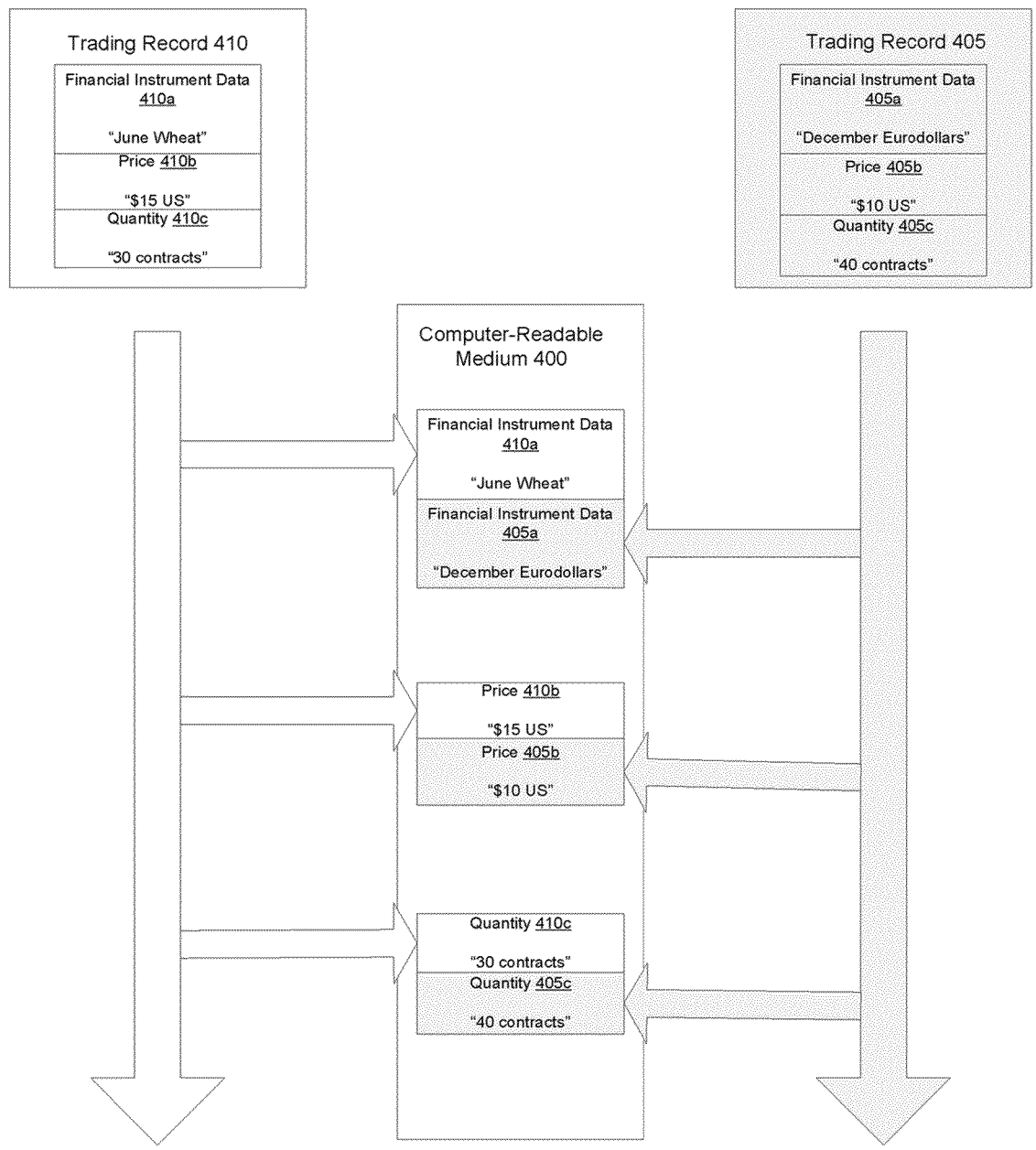
FIG. 4a illustrates yet another illustrative collection of trading data.

As briefly mentioned above, one or more trading records may include multiple fields. Optional step 225 may be implemented to determine if one or more of the trading records includes more than one field. Upon determining that more than one field exists, step 230 may optionally be initiated to parse a first field from one of the trading records. As shown in FIG. 4, data 405, which may be similar to trading record 305 is received and it is determined through a process, such as process 225, that it comprises multiple fields. Optional step 230 may be initiated to parse the data into a plurality of fields. Data 405 may be parsed into at least three fields, wherein financial instrument data 405*a* includes an identification of the financial instrument, such as an option contract to purchase wheat in June, price data 405*b* comprises information on the price of the contract, and quantity data 405*c* may include information on the quantity, such as quantity of financial instruments. More or fewer fields may be utilized in various embodiments. Optional step 235 also or alternatively may be implemented to determine if a field present in received data, such as trading record 405 includes a new field, wherein upon the detection of a new field, a portion of the computer readable medium may be allocated to store data associated with the new field (step 240). While step 225 is shown in relation to receipt of the first trading record, the step may be utilized upon receipt of any of the trading records.

In one embodiment, data associated with a first field of a trading record, such as financial instrument data 405*a* may be stored in a first location on the computer readable medium (step 245). Data associated with other fields of the same record is not stored substantially sequential to financial instrument data 405*a*, but may be placed on the computer readable memory at a different location (see exemplary embodiment of step 250). Upon receiving another trading record, such as trading record 410, it too may be parsed into a plurality of data associated with different fields. For simplicity, FIG. 4 shows trading record 410 subdivided according to the same fields as record 405. As shown in the figure, step 250 sequentially stores the data having a matching field (410a comprises information relating to the field of "financial instrument") on the computer-readable memory, wherein data of the first field 405a that was initially stored in step 245 is substantially physically adjacent to the data of the first field 410a that was stored in step 245.

Other matching fields of different trading records, such as trading records 405 and 410 may also be stored in the same manner. For example, price fields 405b and 410b are stored sequentially wherein price data 410b is substantially sequential to and follows price data 405b. (see also; quantity data 405c and 410c). The data may be stored sequentially as it is received and in at least one embodiment is stored in real time allowing for the fast storage and manipulation of the data without having to construct and update a database-type index. Moreover, while the illustrated computer-readable memory of FIG. 4 illustrates a single medium, one skilled in the art will realize a plurality of computer readable media could be utilized to achieve similar results.

Figure 4B:
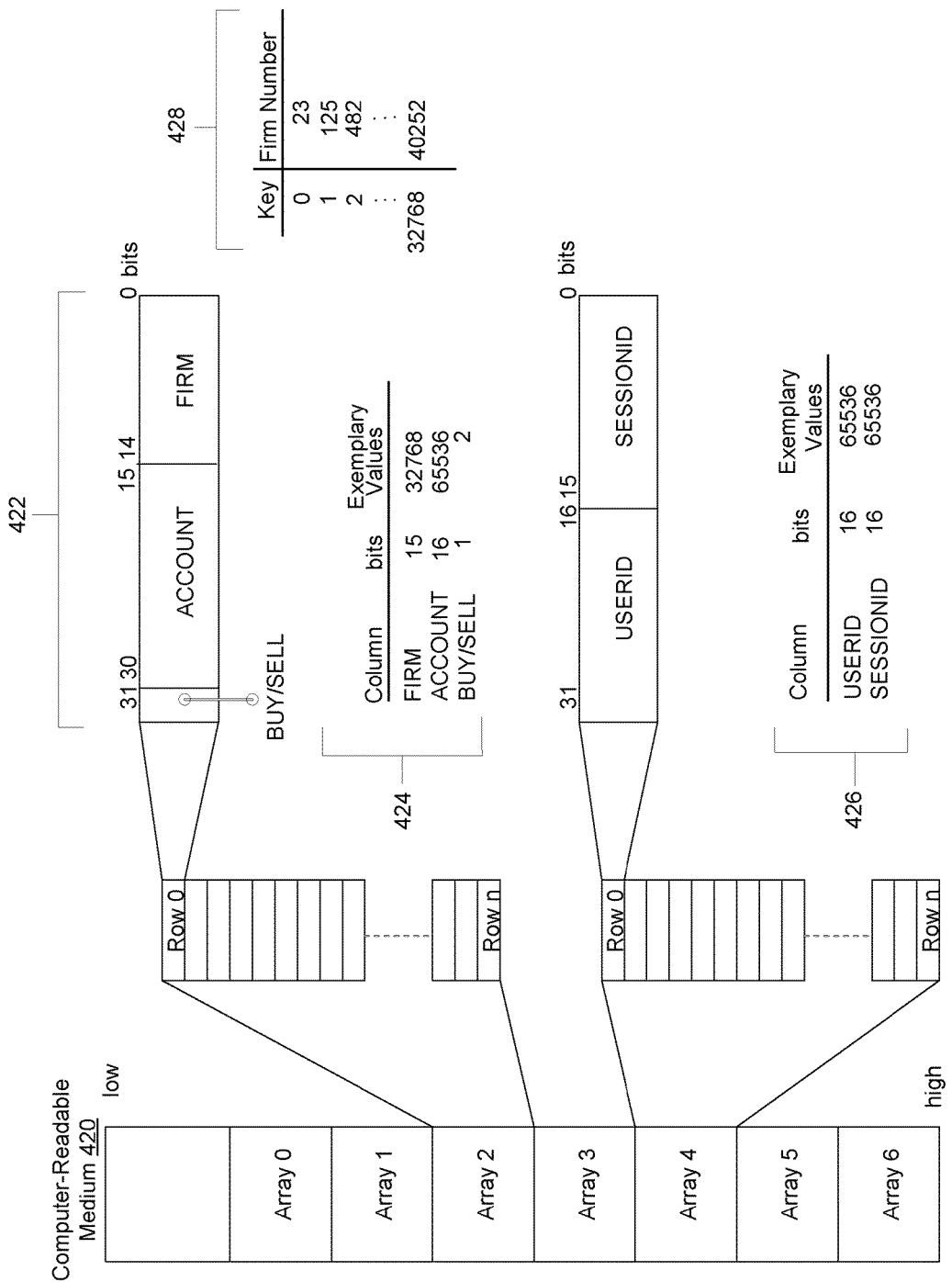
FIG. 4b illustrates the structure of an alternative collection of trading data.

FIG. 4b illustrates the structure of an alternative or additional computer-readable collection of trading data. A computer-readable medium 420 includes a plurality of arrays that contain trading data. Each array includes a particular type of data for a plurality of records. For example, array 2 includes buy/sell, account and firm data for a plurality of trading records and array 4 includes userID and sessionID data. Each record is assigned to a unique row. Section 422, which represents row 0 of array 2 includes 32 bit rows. Bits 0-14 identify the trading firm, bits 15-30 identify the account and bit 31 is used to identify data as corresponding to a buy or a sell. Section 424 illustrates exemplary values for the fields identified in array 2 and section 426 illustrates exemplary values for the fields identified in array 4.

Keys may be used to represent values and facilitate further processing. The keys utilize table based compression to remove gaps in data. Section 428 shows exemplary firm number keys. The firm field in section 422 includes 15 bits, which allows for 32,768 unique keys. The actual firm numbers used may include gaps. For example, section 428 shows that the first firm number used is "28" and the second firm number used is "125." When assigning keys, the keys may be arranged in sequential order corresponding to the sequential order of the firm numbers to facilitate searching. Section 428 shows that the lowest firm number of "28" is assigned a key value of "0" and the next highest firm number of "125" is assigned a key value of "1."

Arranging keys in the same order as firm numbers allows for the rapid searching of firm numbers within a specified range. Of course keys for some or all of the additional fields, such as account number, sessionID, userID, price, date and time, may also be arranged in sequential order, alphabetical order or other orders that facilitate searching. When new records are added, keys may be reassigned to ensure that the order of the keys corresponds to the order of the data.

A query on a computer readable medium, such as computer readable mediums having data stored in accordance with several or all of the steps and embodiments discussed in regards to FIGS. 2-4 may be performed. A query may relate to a method of processing an order received at a match engine. An order for at least one financial instrument may be received at a match engine, which may be implemented, for example, with match engine module 106. At least one parameter or field may be extracted from the order. Upon extracting the at least one field or parameter, the field(s) that were extracted are compared to fields and/or parameters within a non-indexed collection of data representing pending orders.

For example, looking back to FIG. 3a, where trading records 305, 310 and 315 represent pending orders, the comparison may be initiated at the upper starting portion of record 305 and proceed through trading records 305, 310, and 315 in a sequential manner based on proximate physical location of the records. Since there is no database-type index, the data within trading records 305, 310 and 315 may be analyzed from different angles or perspectives at a more rapid pace than utilizing conventional database structures. Indeed, in some situations certain fields of data are unlikely to have data to meet the query being searched. For example, if the query relates to the quantity of financial instrument fields, a query against data located in currency fields is unlikely to yield useful information in many cases. Searching a collection of data arranged such that records or fields are physically located next to one another in a memory module in the direction of a read operation of the search allows for faster query execution when compared to queries performed on indexed databases having records or fields distributed throughout a memory module.

Yet in other embodiments, distinct portions of trading records may be queried and/or a query may be directed to selected portions of trading records. For example, the pending orders may be organized as set forth in FIG. 4, wherein a plurality of trading records are stored wherein matching fields of different trading records, such as trading records 405 and 410 are stored in a substantially sequential fashion without an associated database-like index. For example, price fields 405b and 410b are stored sequentially and wherein price field 410b is substantially sequential to and follows price field 405b. According to one embodiment, only data categorized as having certain fields will be queried. This determination may be based on a user-input, an algorithm, or a combination of user preference and a function of one or software applications.

This can be more readily seen when reviewing FIG. 4. If a query is directed towards the price of a pending order, the comparison of the query and the data stored on the computer readable medium may be initiated at beginning of price data 405b and proceed in a substantially sequential fashion to price data 410b and through any additional price data located following price data 410b. The searching and comparison of the price data within the compared data will be performed without the use of a database-like index and will go in the sequential manner as described above. As stated above, the individual trading records, such as 405 and 410 as well as the individual fields of data such as 405a and 405b may be of a fixed length, thereby allowing a user and/or computer device to readily and accurately estimate the time to conduct the query of the trading records and/or individual data fields.

Figure 5:
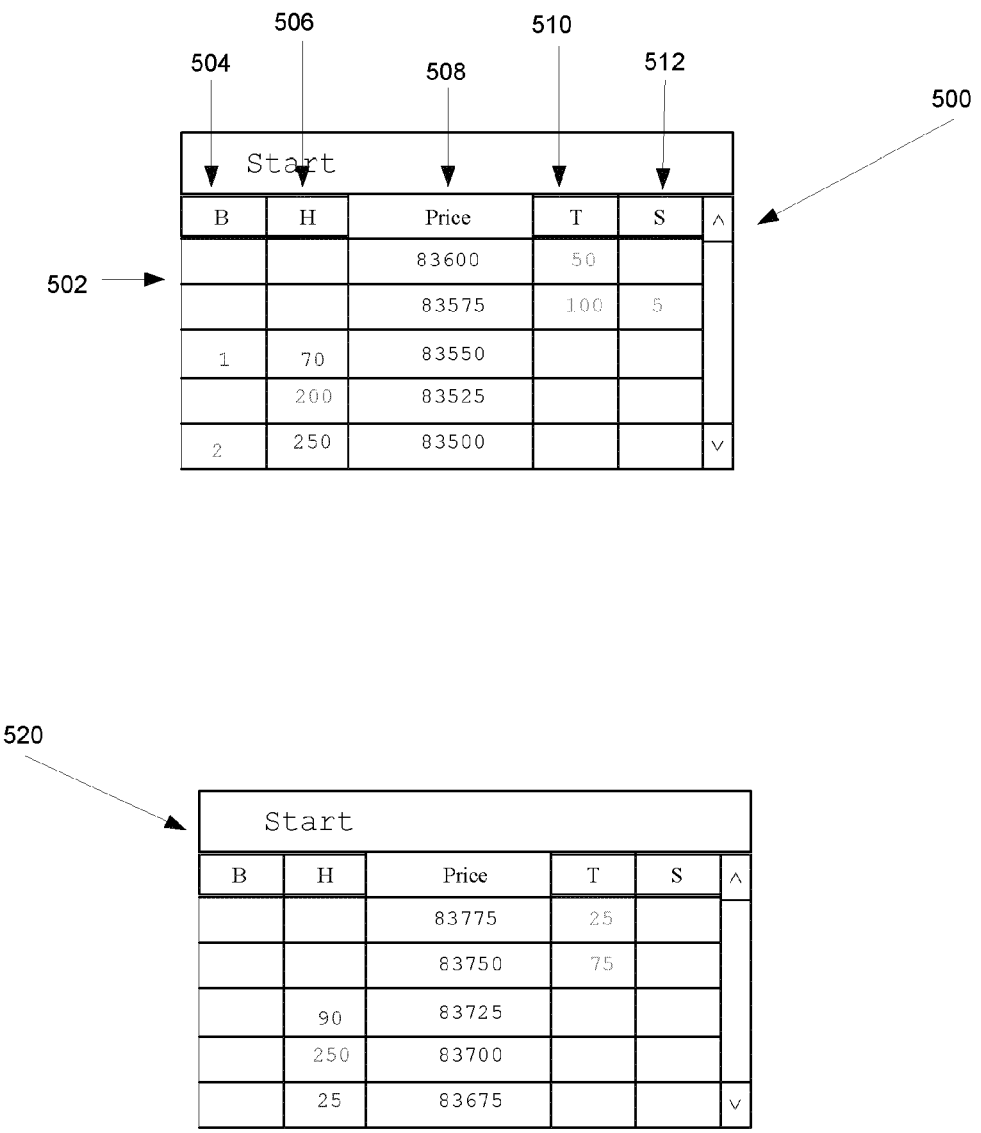
FIG. 5 illustrates an exemplary graphical user interface that may be used to display market depth information.

The speed at which queries may be performed when trading records are arranged as described above may be taken advantage of for other exchange and trading related activities, such as a match engine. FIG. 5 illustrates an exemplary graphical user interface 500 that may be used to display market depth information and allow traders to trade financial instruments. The figure is helpful to understand the type and amount of information that represents the state of a market. Graphical user interface 500 includes a price and quantity grid 502. Price and quantity grid 502 may contain multiple sections, which as shown in FIG. 5 include five columns. A buy column 504 displays a user's working buy order quantities. As used herein, a user may be a trader. Each user will have different values in this column reflecting their buy order quantity. A hit column 506 displays the market bid quantities.

Prices for individual rows are displayed in a price column 508. A take column 510 displays market ask quantities. And, a sell column 512 displays a user's working sell order quantities. Individual entries may be color coded to assist users in quickly interpreting the displayed information. For example, entries in buy column 504 and hit column 506 may be in blue and entries in take column 510 and sell column 512 may be in.

A trading firm, exchange or other entity may record trading records in a non-indexed collection of data, as described above. The speed at which such a collection may be queried and processed allows such entities to quickly recreate the state of an order book, or portions thereof, for any time period. For example, an initial state of the order book may first be determined and then all of the orders placed at an exchange may be processed in the same manner that they would be processed by an exchange until the desired point in time. For example, graphical user interface 500 (shown in FIG. 5) may represent an initial state of a market. All of the incoming orders received at an exchange may be stored sequentially in one or more memory modules as a non-indexed collection of orders such that the physical location of the orders corresponds to the order in which they were received. A computer device may then be programmed to retrieve the orders and recreate the state of the order book.

Graphical user interface 520 represents the state of a order book at some time after the state represented with graphical user interface 500. If we assume that graphical user interface 500 represents the state that existed at 9:00 on Monday morning and graphical user interface 520 represents the state that existed at 2:00 on the following Wednesday, the state represented with graphical user interface 520 may be recreated by starting with the state representing with graphical user interface 500 and processing orders in the sequential non-indexed collection of orders received until 2:00 on Wednesday.

Unlike conventional indexed databases, storing and retrieving trading data according to the disclosed embodiments does not require large quantities of trading data to be executed in batch mode overnight. Indeed, under traditional approaches, large amounts of data could not be adequately analyzed in real-time, thereby preventing many uses of the data. The analysis of the data sequentially stored on the computer readable memory can be continually processed in real-time to monitor activity while new data is being written to the computer readable medium, all without having to create, update, and maintain a space-consuming database index and constant interruption to jump physical locations within the computer readable medium to locate a certain data piece.

Figure 6:
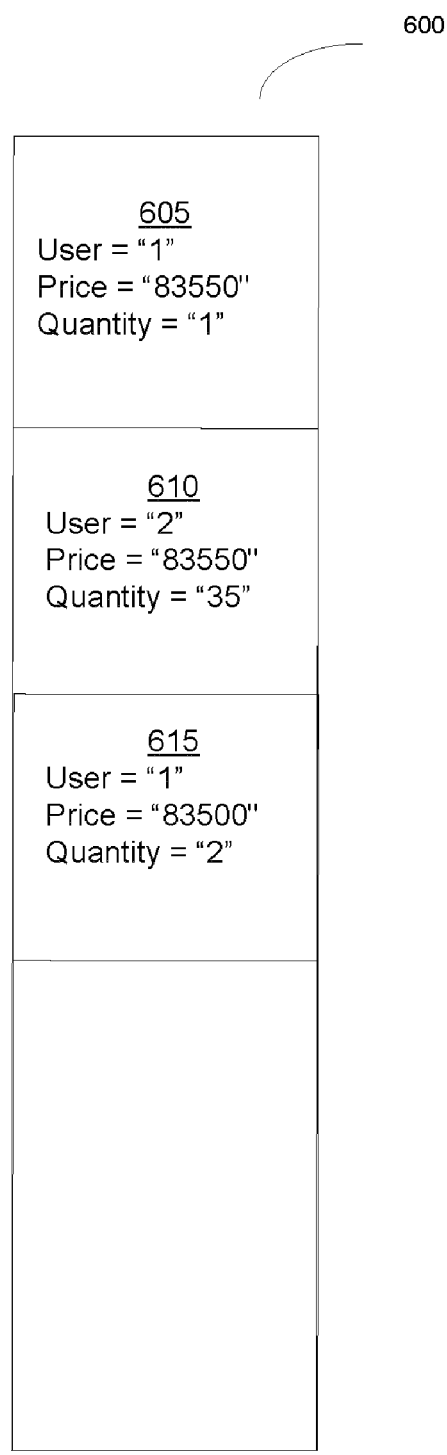
FIG. 6 illustrates one exemplary collection of data arranged in a substantially sequential ordering.

FIG. 6 illustrates one exemplary sequential non-indexed collection of orders stored on a computer-readable medium 600. As seen in the figure, computer readable medium 600 includes multiple orders. Seen at the upper end of computer readable medium 600 is order 605. Order 605 may be, for example, any of the quantities and/or prices displayed in the price and quantity grid 502. Order 610 may represent the next order in time received at an exchange and order 615 may represent the next order in time received at the exchange. One skilled in the art will appreciate that intervals between the receipt of orders 605, 610 and 615 may not be uniform.

Recreating market conditions may be readily accessible by querying methods, for example, as described above. Indeed, the analysis of the data sequentially stored on the computer readable memory can be continually processed in real-time to monitor activity while new data is being written to the computer-readable medium, all without having to create, update, and maintain a space-consuming database index and constant interruption to jump physical locations within the computer readable medium to locate a certain data piece.

Figure 7:
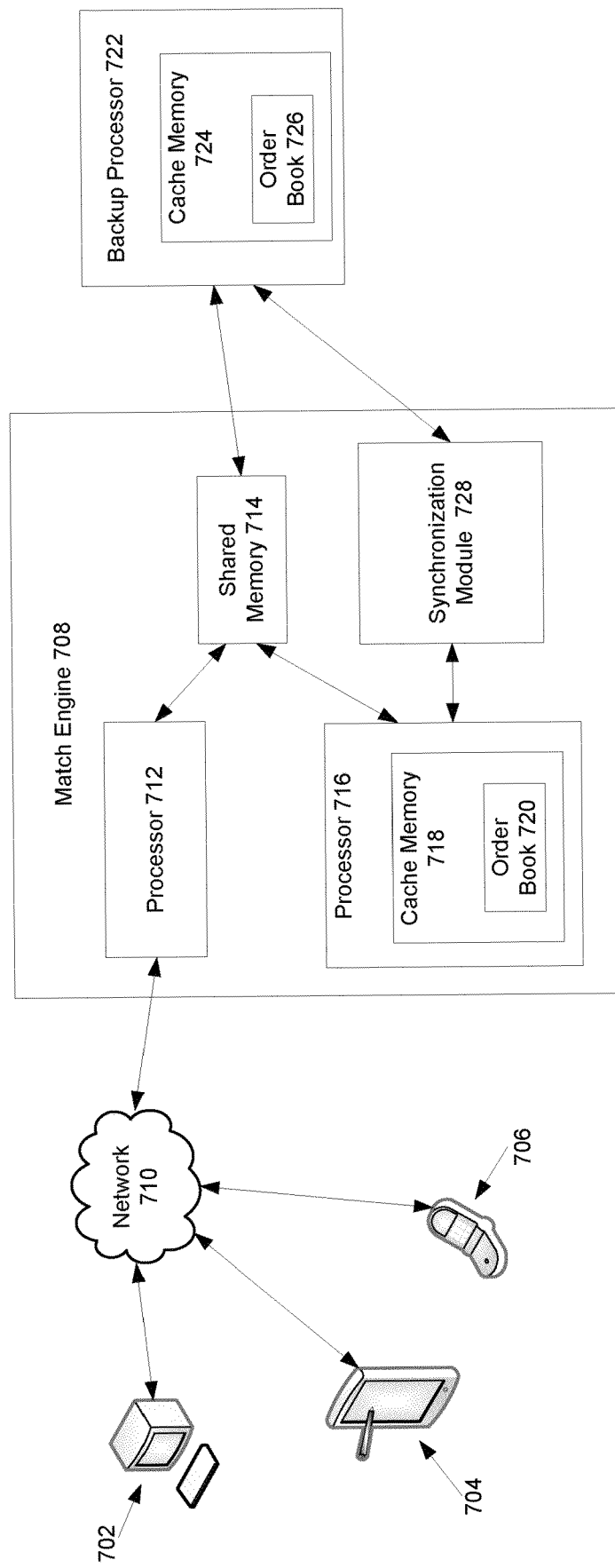
FIG. 7 illustrates a system for matching trades.

FIG. 7 illustrates a system for matching trades. Computer devices 702, 704 and 706 may be used to transmit orders for financial instruments to a match engine 708 via a network 710. Network 710 may be implemented at least in part with the Internet, a WAN, a LAN, a phone network or other infrastructure used for exchanging data between computer devices. Incoming orders are received at a processor 712. Processor 712 may encode incoming orders and transmit them to a shared memory 714. Encoding may include reducing the size of the order. For example, an order may be received at processor 712 that includes the name of a trading firm. During the encoding process, the trading firm name may be replaced with a number that represents the trading firm.

A second processor 716 may be configured to periodically check shared memory 714 for new orders. Processor 716 may include a cache memory 718 that includes one or more order books, such as order book 720. The physical locations of pending orders stored in cache memory 718 may correspond to the order in which they were received at the match engine. When a new order is received, the order may be compared to orders that are included in order book 720. The use of two processors 712 and 716 allows for fast operation when matching of trades. In alternative embodiments, the functions performed by processors 712 and 716 may be performed by a single processor and/or by three or more processors. An exemplary processor that may be used is an Intel Itanium II, which contains a 9 MB byte cache memory. Another exemplary processor is the AMD Opteron processor, which utilizes Hypertransport™ technology.

After trades are matched, market data may be generated by processor 716 and then transmitted to shared memory 714. Processor 712 may periodically check shared memory 714 for market data messages. When market data messages are received, processor 712 may format or expand the market data message and then distribute the market data message to trading entities, such as those represented by computer devices 702, 704 and 706. Processor 712 may also distribute other information to trading entities, such as acknowledgement messages.

The speed at which processor 716 may process orders and the low-cost of such processors facilitates the use of redundant components and backup mechanisms. For example a backup processor 722 may include a cache memory 724 that includes an order book 726. Order book 726 may be synchronized with order book 720, such that in the event that processor 716 fails, backup processor 722 may resume matching of trades. A synchronization module 728 may be used to synchronize order books 720 and 726. In one embodiment, processor 716 and backup processor 722 transmit information identifying the states of order books 720 and 726 to synchronization module 728. Synchronization module 728 may then compare the states of the order books and make any adjustments that are necessary.

Match engine 708 may include several different processors that are configured to match a variety of different trades. Shared memory 714 may group new orders such that each of the processors knows which order to process. For example, a first processor may maintain a first order book and match trades against the first order book and a second processor may maintain a second order book for a different financial instrument and match trades for those financial instruments.

Backup processor 722 may be included within match engine 708. Alternatively or in addition, backup processor 722 may be connected to match engine 708 via a local area network or wide-area network. Backup processor 722 may be in a different geographic location than processor 716. For example processor 716 may be located within a first premises and backup processor 722 may be located in a different premises to prevent all processors from failing because of a fire or other event at the first premises. Two or more processors may also be geographically distributed and may be configured to process orders originating from different geographic regions. For example, processor 716 may be located in Chicago and may process orders originating in the United States and a second processor may be located in London in may be configured to process orders originating in that region.

Figure 8:
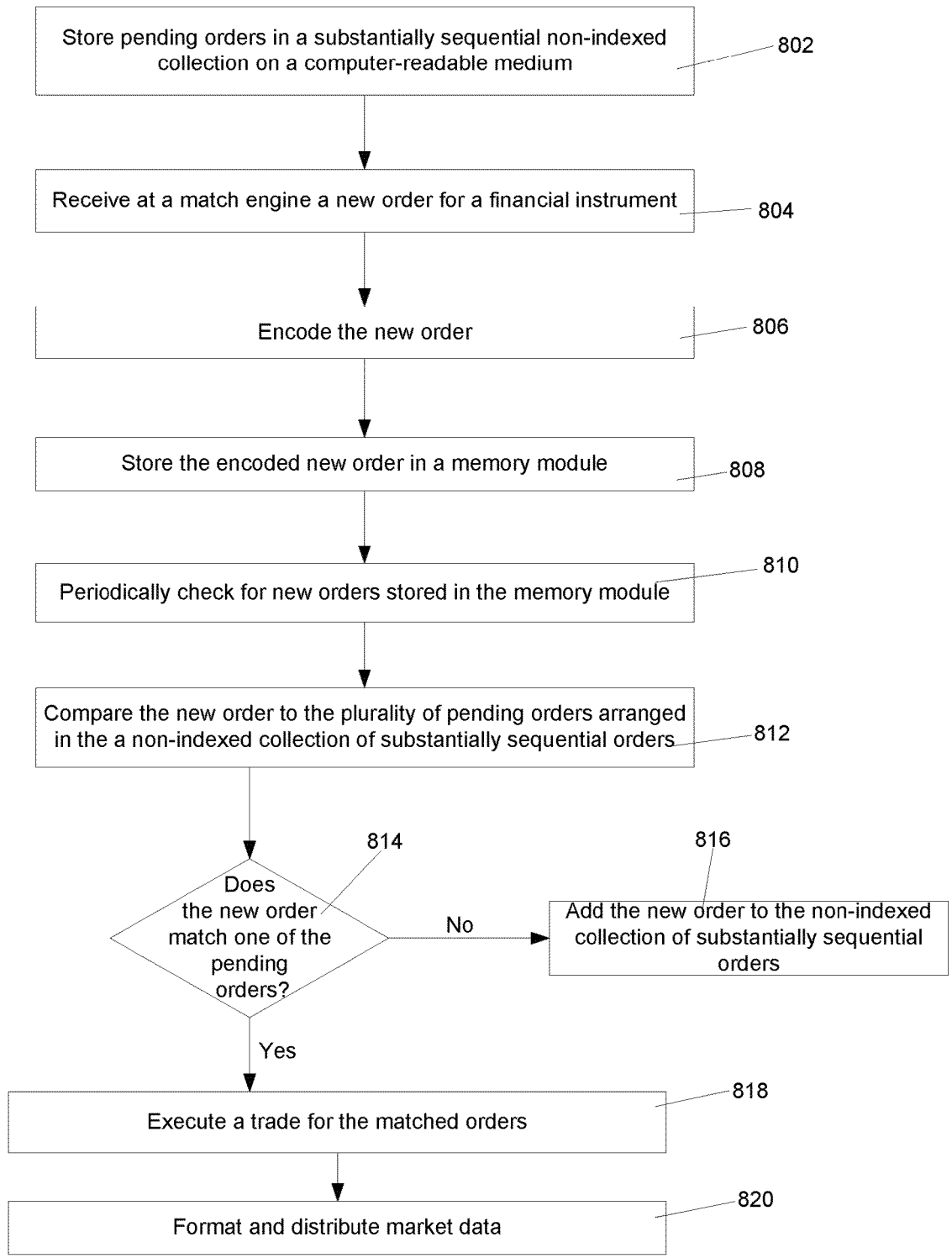
FIG. 8 illustrates a method of processing orders with the system shown in FIG. 7.

FIG. 8 illustrates a method of processing orders with the system shown in FIG. 7. First, in step 802 pending orders are stored in a substantially sequential non-indexed collection on a computer readable medium. The computer readable medium may include a cache memory of a processor to facilitate rapid processing of incoming orders. Next, in step 804 a new order for a financial instrument is received at a match engine. The new order may be encoded in step 806. Encoding may include reducing the file size of the order and placing the order into a standard format that is recognized by components of the match engine. Next, in step 808 the encoded order may be stored in a memory module. The memory module may include a RAM memory that is accessible by more than one processor. In step 810, a processor may periodically check for new orders stored in the memory module. Steps 806 and step 810 may be performed by the same or different processors.

In step 812 the new order is compared to the plurality of pending orders arranged in the non-indexed collection of substantially sequential orders. It is then determined whether the new order matches one of the pending orders in step 814. When the new order does not match one of the pending orders, in step 816 the new order is added to the non-indexed collection of substantially sequential orders. Step 816 may include adding the new order to an existing order book. If the new order does match one of the pending orders, a trade for the matching orders may be executed in step 818. Finally, in step 820 market data may be formatted and distributed.

Figure 9:
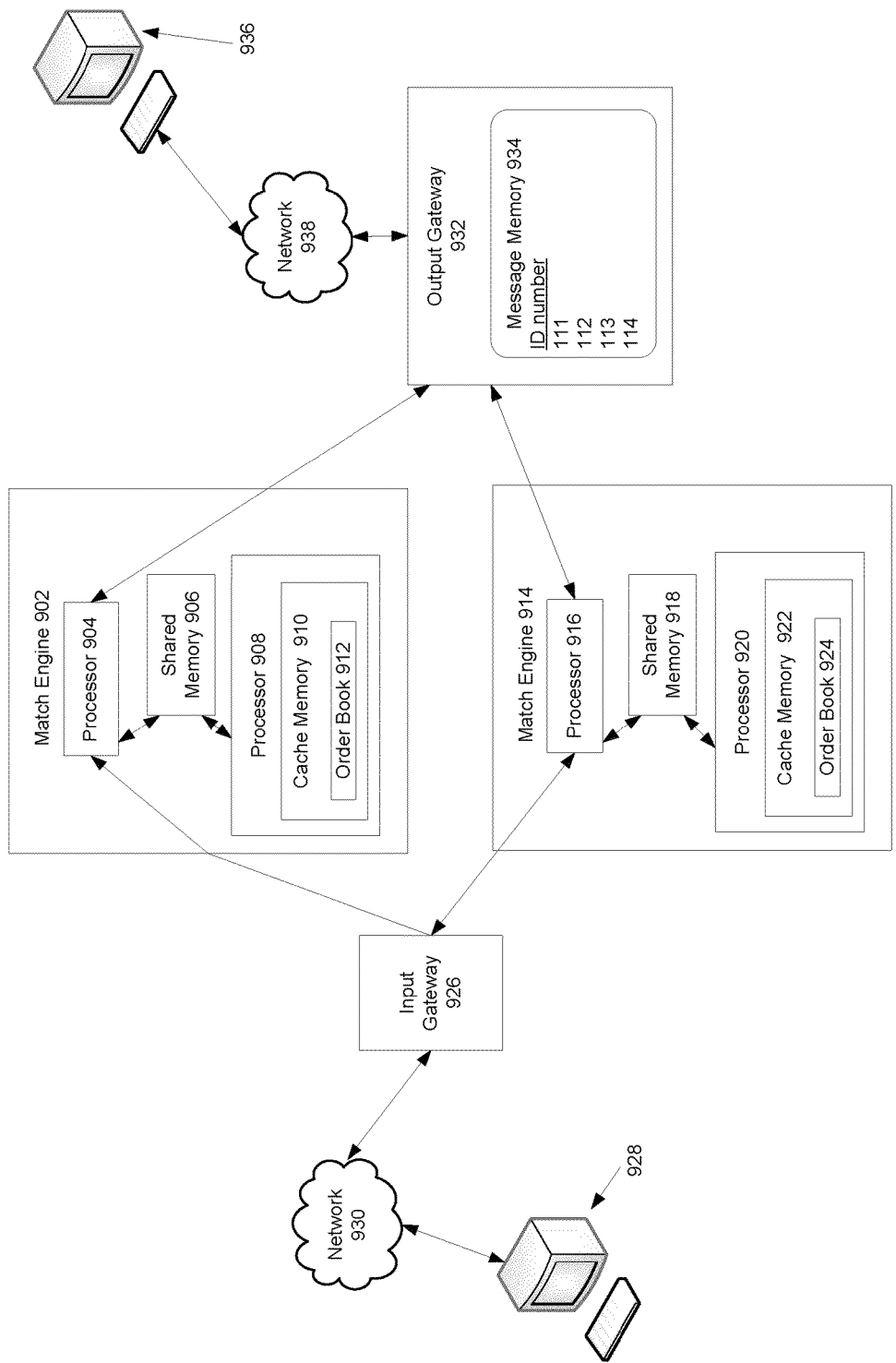
FIG. 9 illustrates a system for matching trades that uses redundant match engines.

FIG. 9 illustrates a system for matching trades that uses redundant match engines. A first match engine 902 includes a first processor 904, a shared memory 906 and a second processor 908. Processor 908 includes a cache memory 910 that may include one or more order books, such as order book 912. A second match engine 914 includes a first processor 916, a shared memory 918 and a second processor 920. Processor 920 includes a cache memory 922 that may include one or more order books, such as order book 924. The components within match engines 902 and 914 function similar to corresponding components located within match engine 708 (shown in FIG. 7).

The match system shown in FIG. 9 includes an input gateway 926. Input gateway 926 receives orders, assigns identifying information to the orders and distributes the orders to match engines 902 and 914. Input gateway 926 may be implemented with a computer device configured to route data and assign identifying information. In operation computer device 928 may transmit an order for a financial instrument to input gateway 916 via network 930. Network 930 may be implemented at least in part with a WAN, LAN, phone network or other infrastructure used for exchanging data between computer devices. After receiving the order, input gateway 926 may assign an identification number to the order and transmit the order to match engines 902 and 914. In alternative embodiments, additional match engines may be included and input gateway 926 may transmit orders to some or all of the match engines.

In the embodiment shown, match engines 902 and 914 receive orders from input gateway 926 and process those orders in parallel. Match engines 902 and 914 include the same data in order books 912 and 924 and are configured to produce the same results. Output messages from processors 904 and 916 are transmitted to an output gateway 932. Output gateway 932 may be implemented with a computer device configured to route data. In one embodiment, input gateway 926 and output gateway 932 are implemented with the same computer device. Output gateway 932 may include a message memory 934 that stores information identifying messages that have been transmitted by output gateway 932. At least part of the identifying information may be assigned by input gateway 926. The identifying information may be used to make sure that data for an event is only distributed once. For example, input gateway 926 may assign and identification number to a new order and then transmit the order to match engines 902 and 914. Match engines 902 and 914 may process the order in parallel and generate market data messages. The market data messages include the identification number assigned by input gateway 926. When market data messages are received at output gateway 932, output gateway may be configured to search identification numbers stored in message memory 934 to determine if a corresponding market data messages has been transmitted. When a message is received that includes an identification number not stored in message memory 934, the message is distributed to trading entities, such as to computer device 936 via network 938. When a message is received that includes an identification number that is stored in message memory 934, the message may be discarded.

One skilled in the art will appreciate that a variety of different protocols may be used to assign identifying information to data received at input gateway 926 and then filter data at output gateway 932. A new order may be assigned an identification number at input gateway 926 and derivative identification numbers may be assigned to messages associated with that order. For example, a new order may be assigned a 15 digit identification number and an acknowledgment message may be assigned an identification number that consists of the 15 digit identification number followed by a character or number that identifies the type of message. This allows multiple messages associated with a single order to all be assigned unique identification numbers that are related and ensures that match engines 902 and 914 assign the same identification numbers to created messages.

In the event of a failure of one of match engines 902 or 914, output gateway 932 would receive messages from only one match engine and continue to process messages without any failure being apparent to trading entities. In embodiments that include more than two match engines operating in parallel, the failure of one or two match engines would not be apparent to trading entities. Match engines 902 and 914, as well as any additional match engines, may be located in the same location or may be distributed to prevent a fire, network failure or other catastrophic event from halting the operation of all match engines.

The speed at which incoming orders may be processed when pending orders are arranged in a substantially sequential non-indexed collection in the cache memory of a processor allows for the processing of many types of orders. Existing match engine systems limit the type of orders that traders may make. For example, it not practical to process an order that does not have a standard format, such as an order to buy four particular contracts and sell six other contracts, because of the time required to match a single novel order having several legs to several different orders.

With the system described above the processing of orders can be quickly performed, which allows for many types of orders. For example, a trader may enter a nonstandard order that contains multiple legs in different markets. The systems shown in FIGS. 7 and 9 may rapidly attempt to match all of the legs of the nonstandard order without incurring reductions in throughput that would be incurred with conventional systems. Match engines 708, 902 and 914 may be programmed to perform implied pricing functions for nonstandard orders. Alternatively, a trader may provide prices for one or more legs of a nonstandard order.

Figure 10:
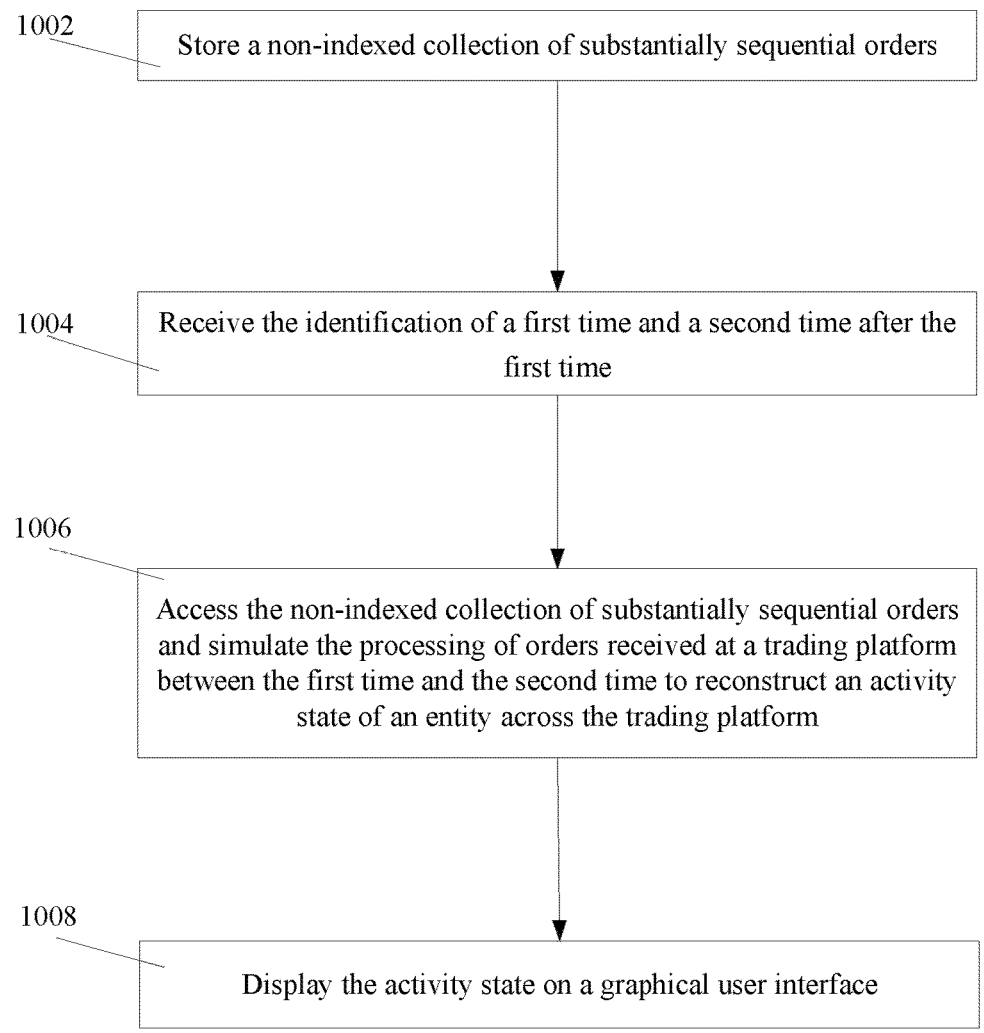
FIG. 10 illustrates a computer implemented method of reconstructing an activity state of an entity across a trading platform.

The speed at which orders may be processed when they are arranged in a substantially sequential non-indexed collection allows one to quickly reconstruct an activity state of an entity across the trading platform and/or reconstruct the state of an order book at any given time. Traders, trading firms and exchange regulatory or enforcement divisions may wish to reconstruct the state of a market for a variety of purposes. FIG. 10 illustrates a computer implemented method of reconstructing an activity state of an entity across a trading platform. The trading platform may include a single exchange, multiple exchanges or other entities or combinations of entities that allow for the trading of financial instruments. First, in step 1002 a non-indexed collection of substantially sequential orders are stored. The orders may be stored in a variety of different memory modules. In one embodiment, the collection of substantially sequential orders may be stored in a processor memory, a solid-state memory or a memory module having no moving parts. The orders may be orders that were received at an exchange or other entity that matches orders for financial instruments and may be orders for futures contracts, option contracts or any other type of financial instrument.

Next, in step 1004, the identification of a first time and a second time after the first time are received. The first and second times may identify a time period over which an activity state of an entity across the trading platform will be reconstructed. For example, if a regulator wanted to determine the profit and loss of a trader between 10:00:21 and 12:31:04 on a given day, the first and second times would be selected accordingly. In step 1006, the non-indexed collection of substantially sequential orders are accessed and a computer device simulates the processing of orders received at a trading platform between the first time and the second time to reconstruct the activity state of an entity across the trading platform. Finally, in step 1008 the activity state is displayed on a graphical user interface. An exemplary graphical user interface is described below. In alternative embodiments activity state data is printed on a report or displayed on a display device in a manner other than a graphical user interface.

Figure 11:
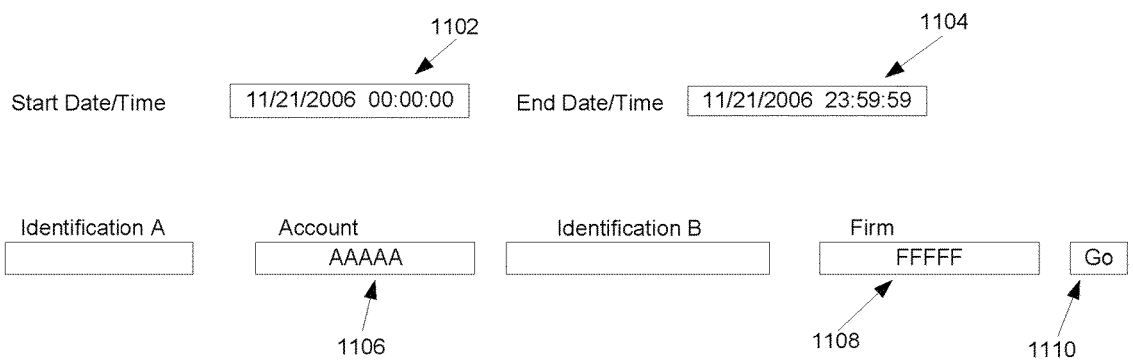
FIG. 11 illustrates a graphical user interface that may be used to initiate a process to reconstruct an activity state of an entity across a trading platform.

FIG. 11 illustrates a graphical user interface that may be used to initiate a process to reconstruct an activity state of an entity across a trading platform, such as the process shown in FIG. 10. A user may enter a start date/time value 1102 and an end date/time value 1104. The start and stop values may correspond the first and second times described above in relation to FIG. 10. A user may also provide identifying information, such as an account value 1106 and/or a firm value 1108. One skilled in the art will appreciate that numerous additional or alternative values may be used to identify a firm, a trader, a session, etc. When selected, a "go" icon 1110 initiates the recreation process with the values provided by the user.

Figure 12:
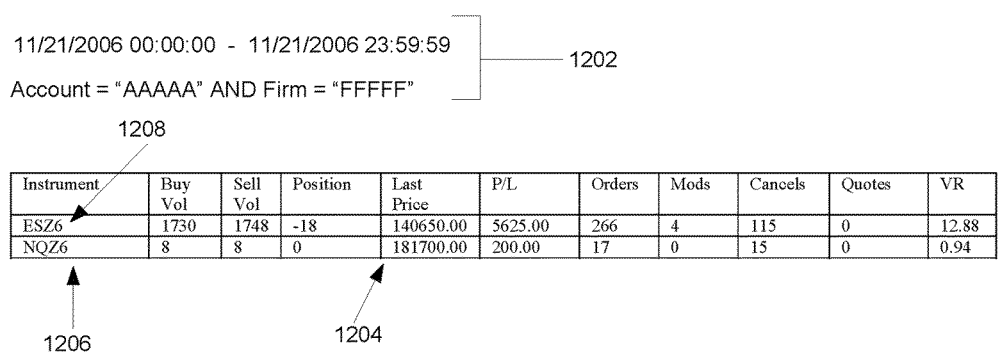
FIG. 12 illustrates a display or a graphical user interface that indicates an activity state of an entity across a trading platform and that results from the input values provided in FIG. 11.

FIG. 12 illustrates a display or a graphical user interface that indicates an activity state of an entity across a trading platform and results from the input values provided in FIG. 11. The identification of the time period and trading entity are found in section 1202. The reconstructed activity state for the entity is shown in section 1204. The activity state may include values that identify instruments, buy and sell volume, net positions, last price, profit and loss, number of orders, number of modifications, number of cancelled orders and number of quotes.

In various embodiments, graphical user interface elements allow users to view order book data at different levels. For example, the instruments displayed in column 1206 may be implemented with hyperlinks that link to additional data. Selecting instrument element 1208 may cause computer-executable instructions to generate the graphical user interface shown in FIG. 13. FIG. 13 shows executed order data 1302 and pending order data 1304 for the selected instrument. Of course numerous additional links may be provided to allow a user to quickly view data different levels of granularity.

Figure 14:
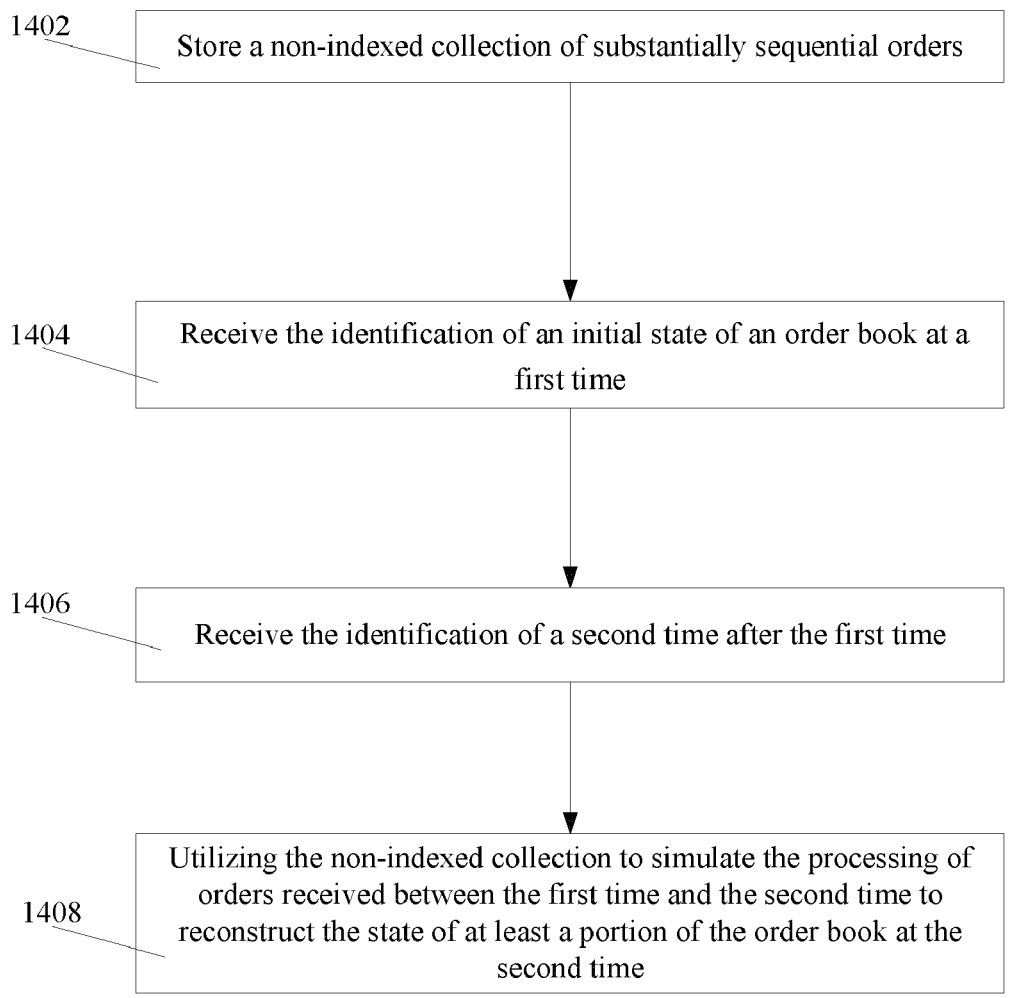
FIG. 14 illustrates a method for recreating a state of an order book.

FIG. 14 illustrates a method for reconstructing a state of an order book. First, in step 1402 a non-indexed collection of substantially sequential orders are stored. The orders may be stored in a variety of different memory modules. In one embodiment, the collection of substantially sequential orders may be stored in a processor memory, a solid-state memory or a memory module having no moving parts. The orders may be orders that were received at an exchange or other entity that matches orders for financial instruments and may be orders for futures contracts, option contracts or any other type of financial instrument. Next, in step 1404, the identification of an initial state of an order book at a first time is received. For example, a computer system may receive information regarding state of an order book that exists when opening on Monday morning. Next, the identification of a second time after the first time is received in step 1406. Step 1406 may include receiving a time of interest to a regulator or other entity monitoring trading activities. For example, if a regulator is investigating whether or not a trader was trying to manipulate a market at a particular time, the particular time would be the second time in step 1406.

Next, in step 1408, the non-indexed collection of orders is utilized to simulate the processing of orders received between the first time and the second time to reconstruct the state of at least a portion of the order book at the second time. Step 1408 may include processing orders in the same manner as used by the match systems described above and may include identifying information at the second time such as the state of a trader's or firm's order book, the state of a portion of a trader's or firm's order book, the profit and loss state, a net position state of the trader and any other information that may be obtained by simulating the processing of orders that are received between a first time and a second time.

The method shown in FIG. 14 may also be modified to allow a user to replay the state of a moving market. For example, a user may create a display having windows that show different information such as a trader's profit and loss and current positions and the stepwise show changes. In one embodiment, changes may be displayed during predetermined time periods. For example, every fifteen seconds the display may be updated to reflect the state of an order book one second later. This allows a user to view 60 seconds of market activity over a fifteen minute period. In another embodiment, the display is updated only after receiving a response from the user. This embodiment allows the user to spend as much time as necessary viewing data before advancing to the next time period.

Various alarms may be automatically generated. For example, a predetermined profit/loss condition for a trading entity may result in the generation of an alarm. The alarm may be in the form of an email message, SMS message, computer generated alarm or other type of alarm that may alert a firm, trader, regulator, trading entity or another of a condition.

Figure 15:
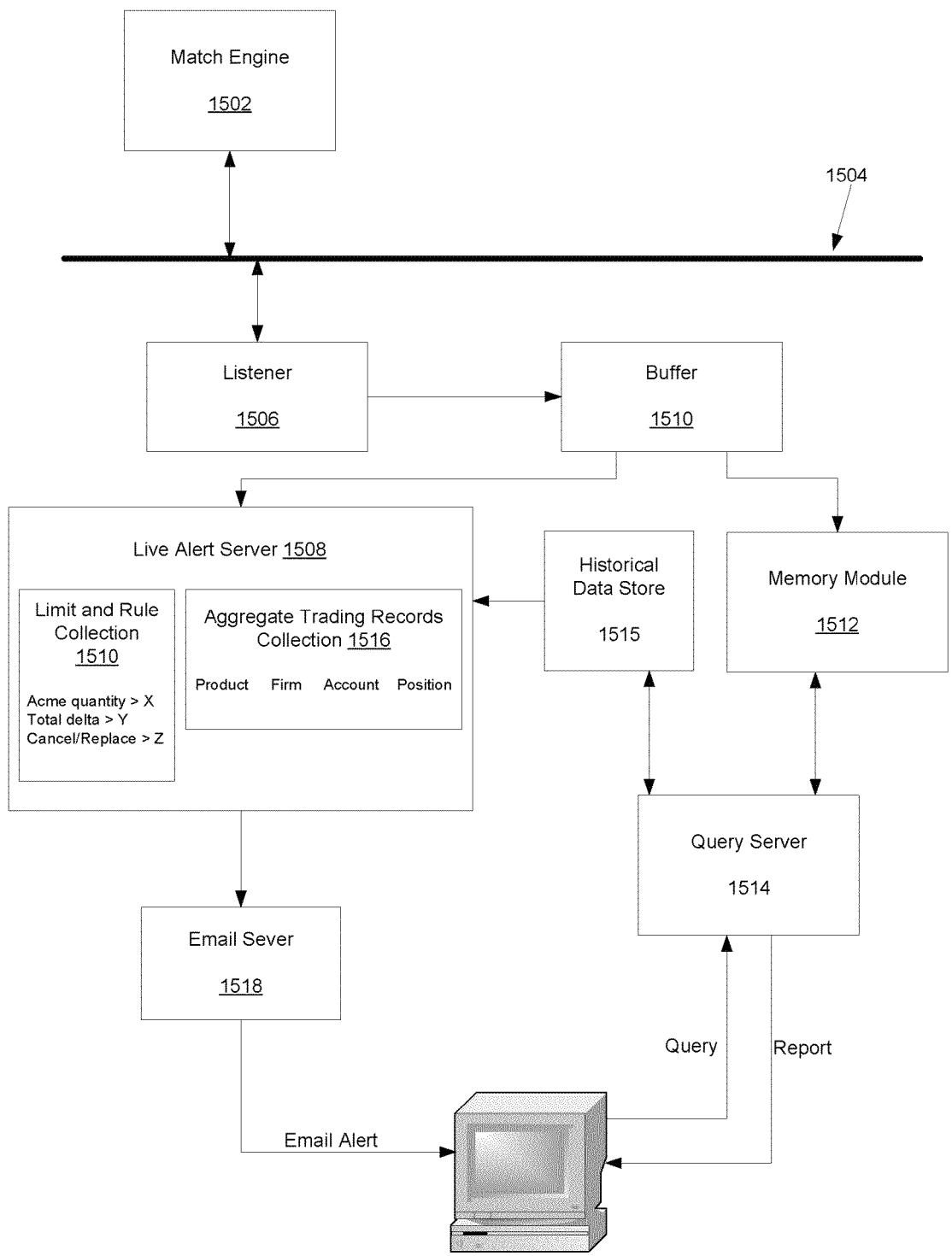
FIG. 15 illustrates a system that may be used to monitor the trading of financial instruments.

FIG. 15 illustrates a system that may be used to monitor the trading of financial instruments. A match engine 1502 provides all of the order flow messages to a bus 1504. Match engine 1502 may be similar to match engine module 106 (shown in FIG. 1). A single match engine is show for illustration purposes only. Several match engines may provide order flow messages. Bus 1504 may be implemented with a TIBCO ActiveMatrix Service Bus.

Different entities may subscribe to messages that are carried along bus 1504. A listener module 1506 monitors messages transmitted along bus 1504 and identifies messages needed by a live alert server 1508. Live alert server 1508 may subscribe to various messages. The subscriptions may be based on message source, message content, intended destination or any other criteria used to identify messages. TIBCO provides exemplary listener modules.

A buffer 1510 receives messages from listener module 1506. Buffer 1510 may match related messages, such as orders and acknowledgement messages. The matched messages may be provided to a memory module 1512. Memory module 1512 may be implemented with a cache memory, such as a processor cache memory and may contain a non-indexed collection of trading messages or records.

Buffer 1510 may also provide trade messages to live alert server 1508. Live alert server 1508 may be configured to analyze trades, orders or combinations. In one embodiment, live alert server 1508 may store aggregate trading records in an aggregate trading records collection 1516 and use the aggregate trading records when analyzing new trades. An alert may be set to alert a regulator, risk manager, trader or someone else when a rule or limit threshold is exceeded. Live alert server 1508 may contain a collection of limits and rules 1514. The exemplary rules provide a maximum quantity of the Acme contracts, a maximum delta value in a maximum number of cancel/replace orders. Additional exemplary thresholds that may be associated with rules or limits include clearing firm limits, position quantities, risk level quantities, order type quantities and other quantities relating to the trading of financial instruments. One skilled in the art will appreciate that a variety of alternative and additional limits and rules may be utilized and in certain embodiments regulators may choose which limits in rules to utilize. Moreover some embodiments may be used to monitor trades and other embodiments may be used to monitor orders and trades.

In operation, live alert server 1508 may receive new trade data for a trader, firm or other entity, add the new trade data to aggregated trading records 1516 and compare the new total to a rule or limit included in limit and rule collection 1514. Live alert server 1508 may then generate a rule message when a rule or limit threshold is exceeded. The rule message may then be transmitted to an email server 1518.

Figure 16:
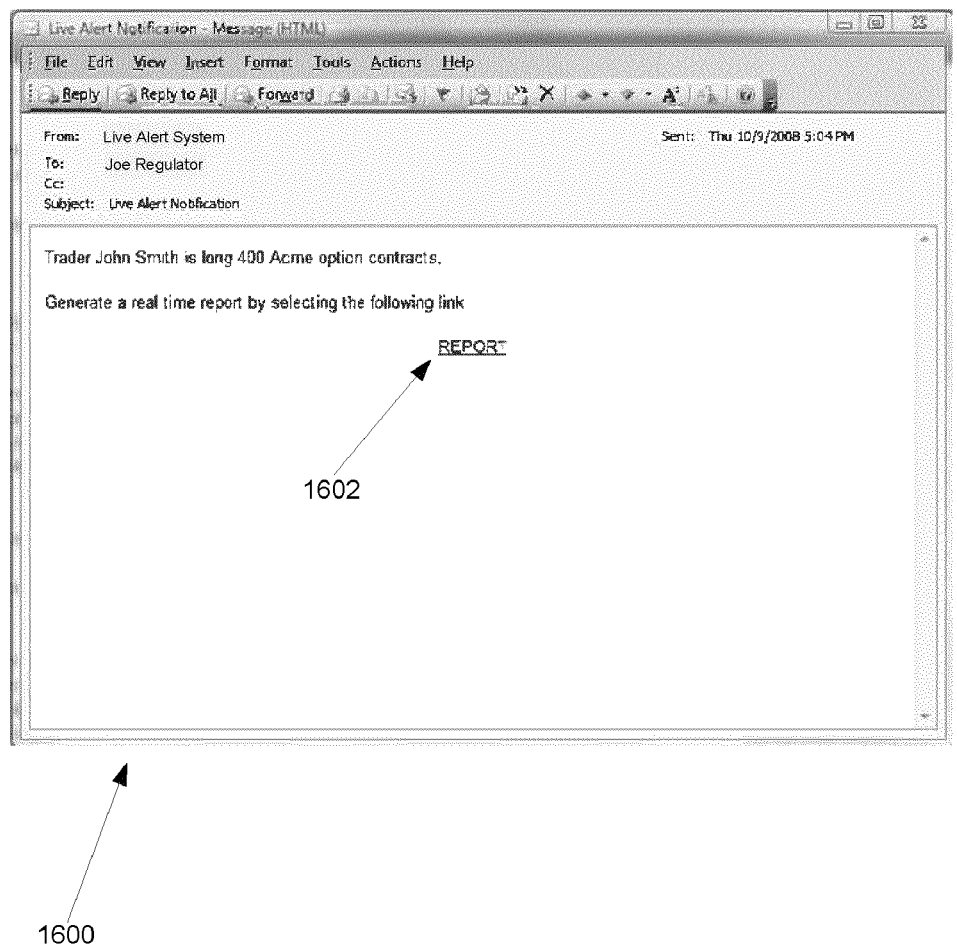
FIG. 16 illustrates an exemplary live alert message, in accordance with an embodiment.

Email server 1518 receives a rule message and generates an email alert message. FIG. 16 illustrates an exemplary email alert message 1600. Email alert message 1600 includes a hyperlink 1602 that may be used for generating a real-time report. Email alert message 1600 may be delivered to a computer device 1520. Computer device 1520 may be implemented with the desktop computer, laptop computer, mobile terminal, phone system or any other device configured to receive e-mail messages.

When a regulator or other entity selects hyperlink 1602, data is extracted from the hyperlink and used to generate a query that is transmitted to a query server 1522. Query server 1522 may then access data stored in memory module 1512 and/or historical data store 1524 to generate a report that is returned to computer device 1520. For example, if live alert server 1508 determines that a quantity limit for ACME option contracts is exceeded by a trader, live alert server 1508 may initiate the transmission of an email message to an exchange regulator. The email message may include a link that when selected generates a query to provide the quantity total for ACME option contracts for the trader. Query server 1522 may use one or more of the methods described above for generating a report. For example, query server 1522 may simulate the processing of orders received and stored in a non-indexed collection of orders between a first time and a second time to determine a quantity. The report may identify products bought and sold, quantities, exposure, risk, profit and loss and other data relevant to a trading entity.

The example shown in FIG. 15 utilizes e-mail messages. Alternative message formats, such as text messages may be used. In another embodiment, instead of utilizing a hyperlink that will be used to generate a report, the report may be generated and attached to the email that is transmitted to the regulator. In yet another embodiment, the email message may include a hyperlink to a report that has already been generated. Embodiments that use hyperlinks that are used to generate reports allow regulators to see current data when reviewing the report, which may be sometime after the email message is generated. Furthermore, such embodiments only generate reports when regulators choose to do so.

A web page may be used to monitor activity. A rule message that is generated when a rule or limit threshold is exceeded may result in a web page being generated that includes account activity or any information that would have been included in a report. The web page may be updated periodically, such as once every minute.

Figure 17:
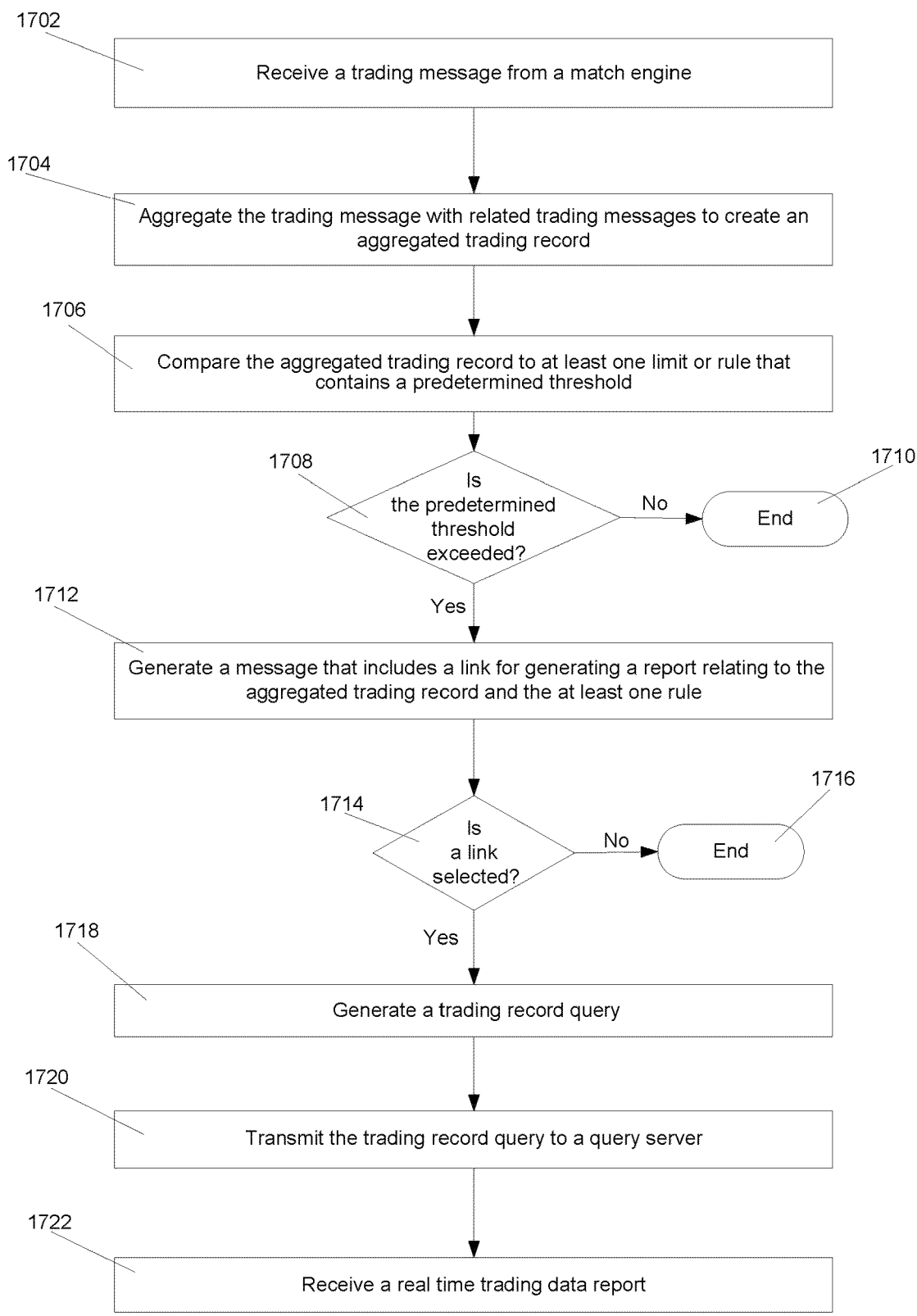
FIG. 17 illustrates a method of monitoring the trading of financial instruments.

FIG. 17 illustrates a method of monitoring the trading of financial instruments. The method shown in FIG. 17 may be implemented with at least some of the components shown in FIG. 15. First, at step 1702 a trading messages received from a match engine. The trading message may be received at a live alert server via a listener, such as listener 1506. Next, in step 1704 the trading message is aggregated with related trading messages to create an aggregated trading record. In aggregated trading record may include the total trades for a trading entity within a predetermined period of time. The aggregated trading record may then be compared to at least one rule or limit that contains a predetermined threshold in step 1706.

In step 1708 it is determined whether or not the predetermined threshold is exceeded. When the predetermined threshold is not exceeded, the process ends in step 1710. One and the predetermined threshold is exceeded, the messages generated in step 1712. The message may include a link for generating a report relating to the aggregated trading record and the at least one limit or rule.

In step 1714 it is determined whether or not the link is selected. When the link is not selected, the process ends in step 1716. A regulator may view the message and determine that follow-up is not necessary and choose to delete or ignore the message. When the link is selected, in step 1718 a trading record query is generated. The trading record query may include information included within that selected link and may be performed at a computer device, mobile terminal, telephone or similar device.

In step 1720, the trading record query may be transmitted to a query server. As shown in FIG. 15, a query server may receive a query and access one or more collections of trading records to generate a report that is responsive to the query. Finally, in step 1722 a real-time trading data report is received. The report may be received at the requesting device or another of device selected by a regular regulator or other entity.

Figure 18:
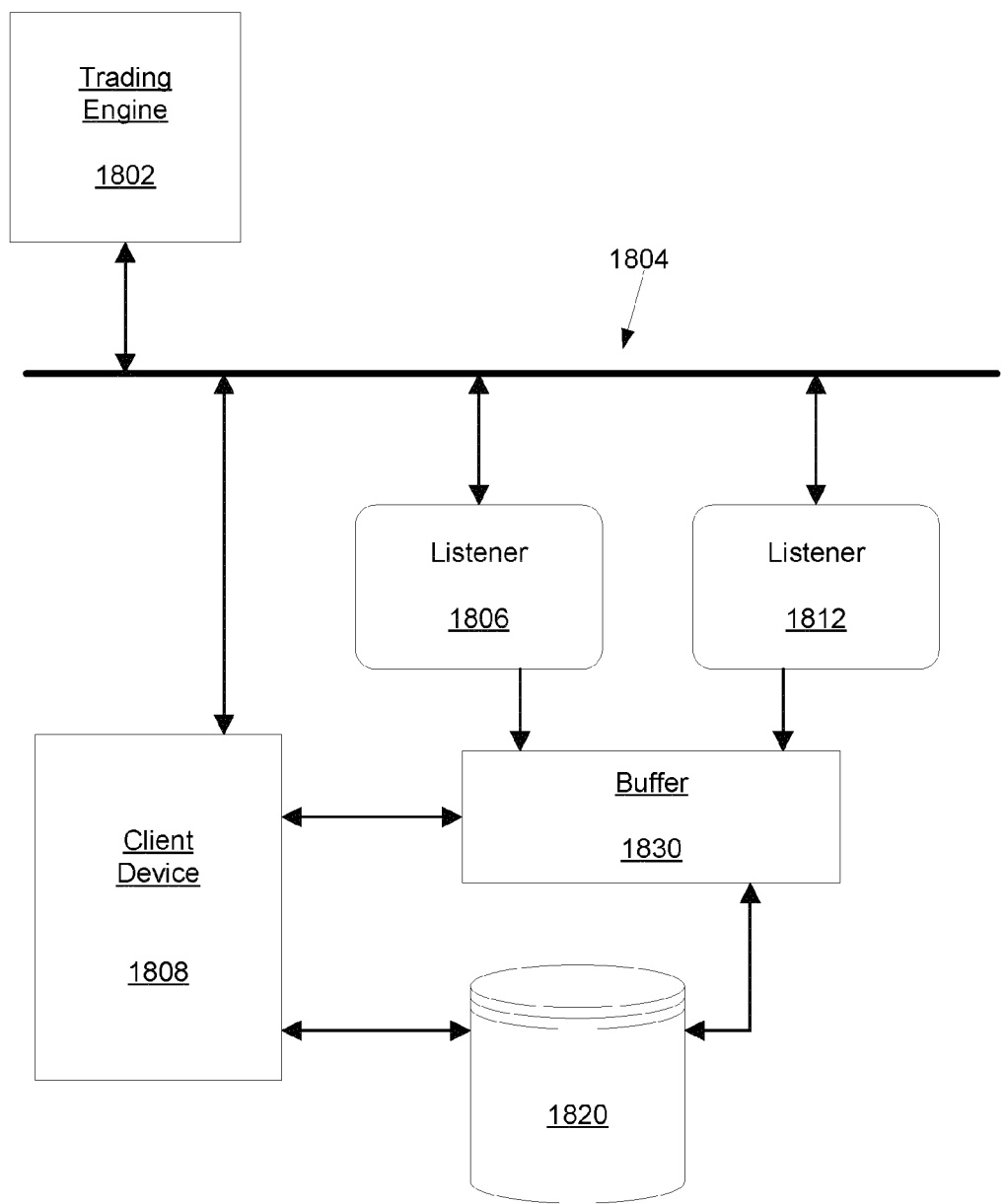
FIG. 18 illustrates a system 1800 monitoring the trading of financial instruments by delivering a plurality of messages to an external client device.

FIG. 18 illustrates a system monitoring the trading of financial instruments by delivering a plurality of messages to an external client device. A communications bus 1804, for example an order entry bus, transmits the plurality of messages. The plurality of messages may be generated by market participants, trading engine 1802, or other components within the trading platform. As discussed above, the system for monitoring the trading of financial instruments may also be applied on the outbound side, where messages are generated by a match engine connected to a trading data bus. Several trading engines or match engines may be in communication with the bus 1804. The bus 1804 may be implemented as a TIBCO ActiveMatrix Service Bus.

Different entities may subscribe to messages that are carried along bus 1804. A publish and subscribe (pub/sub) system may be used. In one embodiment of a pub/sub system, asynchronous messages are broadcast by publishers without specifying the recipients of the messages. Instead, publishers include information in the message to indicate the class of the message. The class of the message may be based on the topic or subject of the message. Subscribers receive messages according to these classes which are indicated by an attribute in the message. The messages are assigned attributes according to the content of the message or the destination of the message.

A first listener module 1806 is one type of subscriber. Listener module 1806 listens to or monitors bus communications 1804 for a first class of messages indicated by the attribute in the messages. A second listener module 1812 also listens to or monitors communications bus 1804. The second listener module 1812 may identify a second class of message indicated by the attributes in the messages.

A buffering system including buffer 1830 receives the messages from the first listener module 1806 and the second listener module 1812. The buffering system is configured to store the plurality of messages for an amount of time. The amount of time may be set in duration. Examples of set durations are a single trading day or a single trading week. Alternatively, the buffering system may be configured to store the plurality of messages using a first in first out (FIFO) algorithm or circular buffer. In other words, a set number of messages or set total size of messages may determine how long the messages are stored in buffer 1830. The messages are indexed in buffer 1830 by a sequence number.

Before storing the message, the buffering system may wrap the message in a new format including supplementary headers. If the TIBCO system is used, the new format preserves the formatting used by the TIBCO listeners and TIBCO ActiveMatrix Service Bus. The supplementary headers include may include data related to the size of the message, the class or attribute of the message, and the time the message was received by the buffer and/or subscriber.

Buffer 1830 may be implemented as a random access memory (RAM), dynamic random access memory (DRAM), flash memory, a hard disk drive, thumb drive, an optical disk (CD ROM, DVD or other optical media), or a solid-state memory modules. The buffering system may additionally include one or more of a processor, a display, and communication devices.

A database 1820 is coupled to buffer 1830 to receive the plurality of messages. Database 1820 permanently stores the plurality of messages. Database 1820 may be implemented as a random access memory (RAM), dynamic random access memory (DRAM), flash memory, a hard disk drive, thumb drive, an optical disk (CD ROM, DVD or other optical media), or a solid-state memory modules. The buffering system may additionally include one or more of a processor, a display, and communication devices.

An external client device 1808 is in communication with buffer 1830, database 1820, and communications bus 1804. The external client device 1808 may be a subscriber in the publish/subscribe system, as described above. The external client device 1808 may receive one or more classes of messages according to the attributes stored in the messages. Live alert server 1508 is one example of an external client device 1808.

Occasionally, the external client device 1808 may not properly receive a message. This may occur if the external client device 1808 malfunctions or experiences down time. More commonly, a message is missed because a network device simply drops a message. The trading engine 1802 identifies that a message was missed when the external client device 1808 to communicate back to the trading engine 1808 that a subsequent message was received out of sequence. Each of the plurality of messages includes a sequence number so that a subscriber can identify when a message is missed. The trading engine 1808 will then retransmit the missed message.

However, the return message creates additional traffic on the communication bus 1804, which compounds the problem because additional messages will not be received by the subscribers. Often, during times of increased market activity a few missed messages will lead to a substantial number of missed messages and a spike in network activity. This series of events may be called a message storm or negative acknowledgement storm.

In order to avoid the congestion of messages, the external client device 1808 generates a request for the missed message that is sent to buffer 1830 or database. If the request is received while the missed message is still stored in buffer 1830, buffer 1830 will provide the stored message to the external client device 1808. If the request is received after the message is no longer stored in buffer 1830, database 1820 provides the stored message to the external client device 1808. Determining whether or not the request is received during the time period comprises indexing the sequence number of the message in the request in the buffer 1830.

The communication bus 1804 may be in communication with a rapid recovery system or storage area network (SAN). The SAN will record all messages from communication bus 1804 in real time as a raw message archive. To recover lost data, the SAN system can play the messages back to the communication bus 1804.

Figure 19:
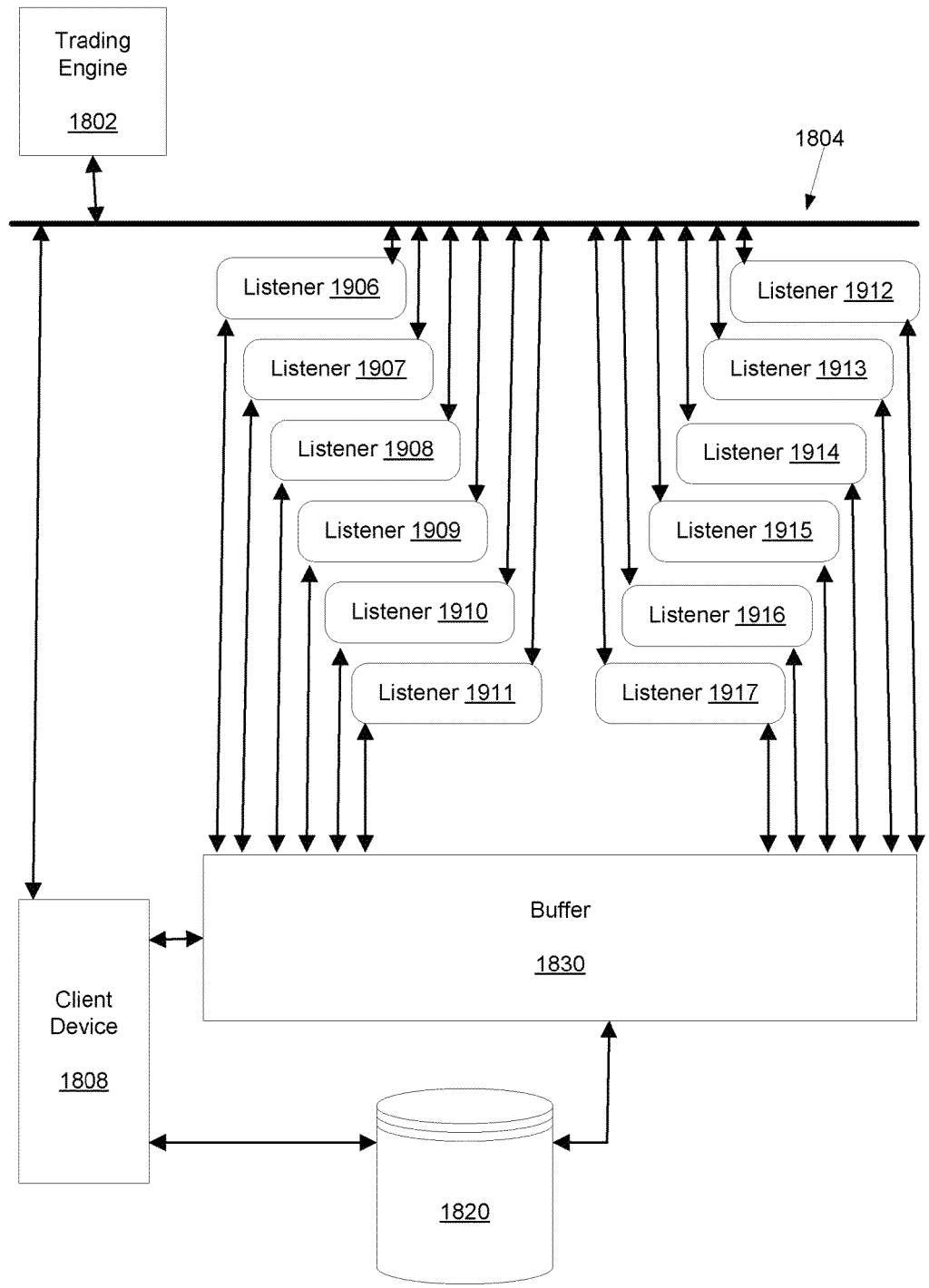
FIG. 19 illustrates another system monitoring the trading of financial instruments by delivering a plurality of messages to an external client device.

FIG. 19 illustrates another system 1900 for monitoring the trading of financial instruments by delivering a plurality of messages to an external client device. The system of FIG. 19 differs from FIG. 18 in that it includes six listeners 1906, 1907, 1908, 1909, 1910, and 1911. The system can be scaled to any size horizontally, i.e. any number of listeners may be used. Each of listeners 1906-1911 subscribes to one or more classes of messages. The system also includes a redundant listener 1912, 1913, 1914, 1915, 1916, 1917, each of which correspond to listeners 1906-1911. The redundant listener 1912-1917 subscribes to the same class of messages as the corresponding listener 1906-1911. Each of listeners is 1906-1917 is in communication with buffer system 1930.

When one the listener modules 1906-1911 misses a message, the buffering system 1930 is configured to store the corresponding message from the corresponding redundant listener modules 1912-1917. The buffering system 1930 may include any number of buffers. For example, the buffering system 1930 may include a number (n) of buffers configured to temporarily stored the messages received from listener modules 1906-1917 and provide the messages to the external client device 1808 upon request.

The messages received from the plurality of listeners are distributed among the buffers according to the modulus (n+1) function performed on data stored in the in the header of the messages. The data used may be the sequence number of the message. For example, if two buffers are used, each would receive every other message regardless of which of listener modules 1906-1917 actually subscribed to that class of messages. If four buffers are used, each would receive every fourth message. The data used may also be an alphanumeric portion of the header, which will produce a more random distribution of messages. For example if the first three characters of the header is data string such as "ABC," the modulus (n+1) function is performed on the ASCII character codes of A, B, and C added together.

Figure 20:
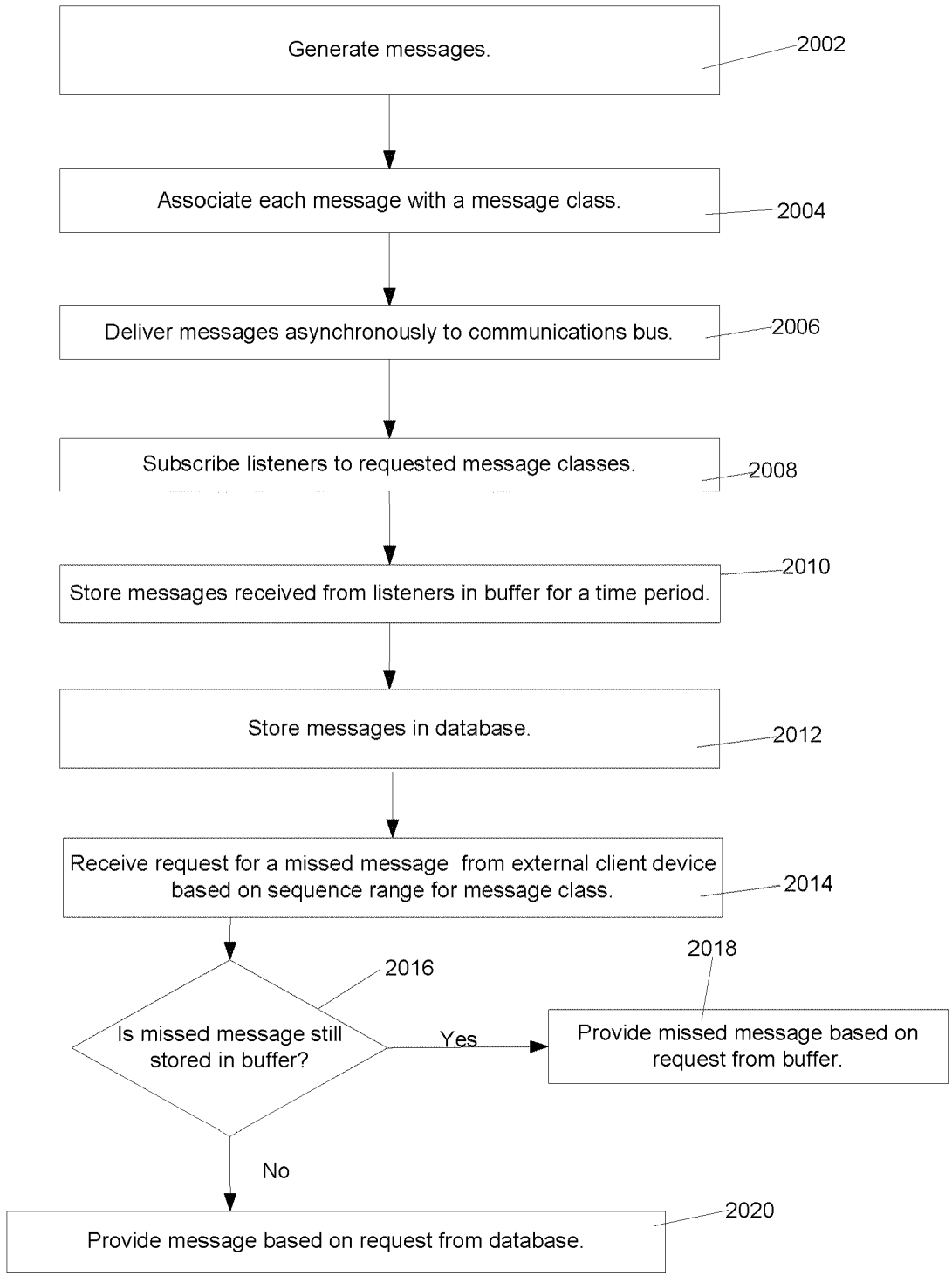
FIG. 20 illustrates a method of monitoring the trading of financial according to the system of FIG. 18 or 19.

FIG. 20 illustrates an exemplary method 2000 for performing the functions of the systems shown in FIGS. 18 and 19. At step 2002 the messages are generated. The messages may either be generated by market participants, the trading engine 1802, or other compents within the trading playform. A message class is associated with each message using an attribute placed in the message at step 2004. Using the pub/sub system, messages are delivered asynchronously to communication bus 1804 at step 2006. Listener modules and external client devices subscribe to messages according to class at step 2008.

At step 2010, messages are received from the listener modules and stored in a buffer 1830 or buffering system 1930 for a time period (T). At step 2012 the messages are more permanently stored in database 1820. At step 2014, a request is received from the external client device 1808 for missed message, and it is determined whether the missed message still stored in buffer 1830 at step 2016. If no, the message is provided from the buffer 1830 or buffering system 1930 at step 2018, and if yes, the message is provided by the database 1820. Determining whether or not the request is received during the time period comprises indexing the sequence number of the message in the request in the buffer 1830.

As used herein, the phrases "in communication with," "coupled to" and "coupled with" are defined to mean directly connected to or indirectly connected through one or more intermediate components. Such intermediate components may include both hardware and software based components.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. For example, aspects of the invention may be applied to data collections that are not related to exchanges or trading. All are considered within the sphere, spirit, and scope of the invention.

What is claimed is:

1. A system for delivering a plurality of messages to an external client device, the system comprising:
   a trading engine configured to generate the plurality of messages and associate each of the plurality of messages with an attribute to define at least a first class of messages and a second class of messages;
   a communication bus configured to receive the plurality of messages from the trading engine and asynchronously deliver the plurality of messages;
   a first listener coupled to the communication bus and configured to subscribe to and receive the first class of messages;
   a second listener coupled to the communication bus and configured to subscribe to and receive the second class of messages;
   a buffering system configured to temporarily store the plurality of messages received from the first listener and the second listener for a first time period and configured to provide at least one of the stored messages to the external client device based upon a request from the external client device;
   a database coupled to the buffering system configured to store the plurality of messages for a second time period subsequent to the first time period, configured to provide the at least one of the stored messages to the external client device based upon the request when the buffering system no longer stores the at least one of the stored messages;
   a third listener coupled to the communication bus and configured to subscribe to and receive the first class of messages; and
   a fourth listener coupled to the communication bus and configured to subscribe to and receive the second class of messages;
   wherein when the first listener misses a message, the buffering system is further configured to store the corresponding message received from the third listener and when the second listener misses a message, the buffering system is further configured to store the corresponding message received from the fourth listener.

2. The system of claim 1, wherein the external client device is configured to subscribe and receive the first class of messages from the communication bus.

3. The system of claim 2, wherein when the external client does not receive a message of the first class of messages from the communication bus, the external device generates the request and sends the request to the buffering system.

4. The system of claim 1, wherein the buffering system stores the message on a first in first out basis.

5. The system of claim 1, further comprising: a second trading engine configure to generate a second plurality of messages and associate each of the second plurality of messages with either the first class of messages or the second class of messages.

6. The system of claim 1, wherein the buffering system further includes a number (n) of buffers configured to temporarily store the messages received from the plurality of listeners and configured to provide the messages to the external client device based upon a request from the external client device.

7. The system of claim 6, wherein the messages received from the plurality of listeners are distributed among the buffers according to a modulus (n+1) function performed on a header of the message.

8. A method for delivering data comprising a plurality of messages from a trading engine to an external client device, the method comprising:
   generating the plurality of messages by the trading engine;
   processing each of the plurality of messages by the trading engine to associate each of the plurality of messages with an attribute to define at least a first class of messages and a second class of messages;
   delivering asynchronously the plurality of messages along a communication bus;
   subscribing a first listener coupled to the communication bus to receive the first class of messages;
   subscribing a second listener coupled to the communication bus to receive the second class of messages;

storing the plurality of messages received from the first listener and the second listener in a buffering system for a time period;

providing a message stored in the buffering system to the external client device based upon a request from the external client device if the request is received during the time period;

storing the plurality of messages in a database coupled to the buffering system;

providing a message stored in the database to the external client device based upon the request from the external client device if the request is received after the time period;

subscribing a third listener coupled to the communication bus to receive the first class of messages; and subscribing a fourth listener coupled to the communication bus to receive the second class of messages;

wherein when the first listener misses a message the buffering system is further configured to store the corresponding message received from the third listener and when the second listener misses a message the buffering system is further configured to store the corresponding message received from the fourth listener.

9. The method of claim 8, further comprising: subscribing the external client device to receive the first class of messages from the communication bus.

10. The method of claim 9, further comprising: generating the request to the buffering system when the external client does not receive a message of the first class of messages from the communication bus.

11. The method of claim 8, wherein the buffering system stores the message on a first in first out basis and the time period depends on a rate that the messages are received at the buffering system.

12. The method of claim 8, wherein the timer period comprises a user defined predetermined duration.

13. The method of claim 8, wherein the buffering system further includes a number (n) of buffers configured to temporarily store the messages received from the plurality of listeners and configured to provide the messages to the external client device based upon a request from the external client device.

14. The method of claim 13, further comprising: distributing the messages received from the plurality of listeners among the buffers according to a modulus (n+1) function performed on a header of the message.

15. The method of claim 8, further comprising: determining whether or not the request is received during the time period comprises indexing a sequence number of the message in the request in the buffer.

* * * * *